US007974742B2

(12) United States Patent
Enis et al.

(10) Patent No.: US 7,974,742 B2
(45) Date of Patent: *Jul. 5, 2011

(54) METHOD OF COORDINATING AND STABILIZING THE DELIVERY OF WIND GENERATED ENERGY

(76) Inventors: Ben M. Enis, Henderson, NV (US); Paul Lieberman, Torrance, CA (US)

( * ) Notice: Subject to any disclaimer, the term of this patent is extended or adjusted under 35 U.S.C. 154(b) by 530 days.

This patent is subject to a terminal disclaimer.

(21) Appl. No.: 12/001,092

(22) Filed: Dec. 10, 2007

(65) Prior Publication Data
US 2008/0172279 A1    Jul. 17, 2008

(51) Int. Cl.
G05D 17/02    (2006.01)
(52) U.S. Cl. ......... 700/291; 700/286; 700/288; 700/295
(58) Field of Classification Search .................. 700/219, 700/286, 295–297, 299; 705/7–8; 196/27; 702/2; 290/44, 55; 60/641.7
See application file for complete search history.

(56) References Cited

U.S. PATENT DOCUMENTS

| 320,482 | A | 6/1885 | Leavitt |
| 874,140 | A | 12/1907 | Valiquet |
| 943,000 | A | 12/1909 | Busby |
| 1,231,051 | A | 6/1917 | Nordberg |
| 2,179,885 | A | 11/1939 | Fumagalli |
| 2,230,526 | A | 2/1941 | Claytor |
| 2,539,862 | A | 1/1951 | Rushing |
| 2,652,699 | A | 9/1953 | Romani |
| 3,151,250 | A | 9/1964 | Carlson |
| 3,677,008 | A | 7/1972 | Koutz |
| 3,806,733 | A | 4/1974 | Haanen |
| 3,979,597 | A | 9/1976 | Drucker |
| 3,996,741 | A | 12/1976 | Herberg |
| 4,055,950 | A | 11/1977 | Grossman |

(Continued)

FOREIGN PATENT DOCUMENTS
BR    200101897 A * 12/2002
(Continued)

OTHER PUBLICATIONS

Ackermann, Thomas and Soder, Lennart. An overview of wind energy-status 2002, Renewable and Sustainable Energy Reviews, vol. 6, Issues 1-2, 2002 [retrieved on Mar. 22, 2010], pp. 67-127. Retrieved from Internet <url: http://www.sciencedirect.com/science/article/B6VMY-45JH3 JP-1/2/58adfbd8b53ae1ac30274d0bfccf9 a 29>.*

(Continued)

Primary Examiner — Ramesh B Patel
Assistant Examiner — Dave Robertson
(74) Attorney, Agent, or Firm — J. John Shimazaki

(57) ABSTRACT

The invention relates to a method of coordinating and stabilizing the delivery of wind generated power, such as to a power grid, or a facility having pneumatically driven equipment, so as to avoid sudden surges and spikes, despite wind speed fluctuations and oscillations. The method preferably uses a plurality of windmill stations, wherein energy can be used directly, and/or stored for later use when demand is high or wind availability is low. The method contemplates forming an energy delivery schedule, to coordinate the use of energy from storage, based on daily wind speed forecasts, which help to predict the resulting wind power availability levels for the upcoming day. The schedule preferably sets a reduced number of constant power output periods during the day, during which time energy delivery levels remain substantially constant, despite fluctuations and oscillations in wind speed and wind power availability levels.

9 Claims, 15 Drawing Sheets

U.S. PATENT DOCUMENTS

| | | | |
|---|---|---|---|
| 4,118,637 A | 10/1978 | Tackett | |
| 4,167,372 A | 9/1979 | Tackett | |
| 4,206,608 A | 6/1980 | Bell | |
| 4,229,661 A | 10/1980 | Mead et al. | |
| 4,304,103 A | 12/1981 | Hamrick et al. | |
| 4,358,250 A | 11/1982 | Payne | |
| 4,441,872 A | 4/1984 | Seale | |
| 4,447,738 A | 5/1984 | Allison | |
| 4,455,834 A | 6/1984 | Earle | |
| 4,525,631 A | 6/1985 | Allison | |
| 4,648,801 A | 3/1987 | Wilson | |
| 4,735,552 A | 4/1988 | Watson | |
| 4,849,648 A * | 7/1989 | Longardner | 290/54 |
| 5,140,170 A | 8/1992 | Henderson | |
| 5,155,375 A | 10/1992 | Holley | |
| 5,206,537 A | 4/1993 | Alejandro et al. | |
| 5,384,489 A | 1/1995 | Bellac | |
| 5,436,508 A | 7/1995 | Sorensen | |
| 5,512,787 A | 4/1996 | Dederick | |
| 5,537,822 A | 7/1996 | Shnaid et al. | |
| 5,642,629 A | 7/1997 | Ohman | |
| 5,685,155 A | 11/1997 | Brown et al. | |
| 5,924,283 A | 7/1999 | Burke, Jr. | |
| 6,512,966 B2 * | 1/2003 | Lof et al. | 700/291 |
| 6,527,671 B2 | 3/2003 | Paalasman et al. | |
| 6,581,394 B1 | 6/2003 | Smolenskiy | |
| 6,863,474 B2 | 3/2005 | Webster et al. | |
| 6,927,503 B2 * | 8/2005 | Enis et al. | 290/55 |
| 7,430,534 B2 * | 9/2008 | Lof et al. | 705/37 |
| 7,432,686 B2 * | 10/2008 | Erdman et al. | 322/44 |
| 2002/0103745 A1 * | 8/2002 | Lof et al. | 705/37 |
| 2002/0194113 A1 * | 12/2002 | Lof et al. | 705/37 |
| 2006/0266035 A1 * | 11/2006 | Ingersoll et al. | 60/641.1 |
| 2008/0050234 A1 * | 2/2008 | Ingersoll et al. | 416/132 B |

FOREIGN PATENT DOCUMENTS

| | | |
|---|---|---|
| DE | 27 17 679 A1 | 10/1978 |
| DE | 43 39 402 A1 | 5/1995 |
| EP | 307 517 A1 | 3/1989 |
| GB | 2020375 | 11/1979 |
| JP | 09 317 495 A | 12/1997 |
| JP | 11 280 638 A | 10/1999 |
| SU | 1163029 A | 6/1985 |
| SU | 1666804 A2 | 7/1991 |
| WO | WO 98/21474 | 5/1998 |
| WO | WO 03004869 | 1/2003 |

OTHER PUBLICATIONS

S.J. Watson, L. Landberg and J.A. Halliday, Application of wind speed forecasting to the integration of wind energy into a large scale power system. IEE Proc.-Gener. Transm. Distrib. 141 (1994), pp. 357-362.*

Strunz K, Brock EK. Hybrid plant of renewable stochastic source and multilevel storage for emission-free deterministic power generation. CIGRE/IEEE PES international symposium on quality and security of electric power delivery systems, Montreal, Canada, Oct. 2003.*

Enis B M, Lieberman P, Rubin I. Operation of hybrid wind-turbine compressed-air system for connection to electric grid networks and cogeneration. Wind Engineering, 2003, 27(6): 449-459.*

E. DeMeo. Implications of wind energy scheduling requirements for wind energy. NWCC Transmission Issue Briefs, National Wind Coordinating Committee (NWCC), Aug. 2003.*

J. P. Barton and D. G. Ingfield. Energy storage and its use with intermittent renewable energy. IEEE Trans. on Energy Conv., 19(2):441-447, Jun. 2004.*

Bullough et al., 2004 Bullough, C., Gatzen, C., Jakiel, C., Koller, M., Nowi, A., Zunft, S., 2004. Advanced adiabatic compressed air energy storage for the integration of wind energy. Proceedings from the European Wind Energy Conference, London, UK, 22-25.*

Mack, Donald R. Something New in Power Technology: Putting the sequeeze on off-peak energy storage. IEEE Potentials, Apr. 1993, p. 40-42.*

Energy Storage Council, 2002, Energy Storage, the Missing Link in the Electricity Value Chain, ESC (Energy Storage Council) White Paper, May 2002, 8 pages.*

Arsie I., Marano V., Nappi G., Rizzo G., "A Model of a Hybrid Power Plant with Wind Turbines and Compressed Air Energy Storage", Proc. of PWR2005 ASME Power, Apr. 5-7, 2005.*

L. Soder. Reserve margin planning in a wind-hydro-thermal power system. IEEE Trans. on Power Syst., 8(2),May 1993.*

Tande Jog. Grid integration of wind farms. Wind Energy 2003; 6: 281-295.*

* cited by examiner

| WIND HISTORY DATE | HYBRID TANKS ||| NUMBER OF TURBINES DIRECT TO TANK | NUMBER OF TANKS | COST** PER kW-Hr (20 yrs) |
|---|---|---|---|---|---|---|
| | NUMBER OF TURBINES DIRECT TO GRID | NUMBER OF TURBINES DIRECT TO GRID | NUMBER OF TURBINES DIRECT TO TANK | | | |
| 11/1/96 | 24 | 19 | 0 | 6 | 15 | $0.033 |
| 11/5/96 | 24 | 6 19.00 | 13 | 6 | 37 | $0.031 |
| 11/6/96 | 24 | 1 19.00 | 18 19.00 | 6 | 62 | $0.033 |

\* 62 TANKS NEED BE PURCHASED
\*\* COST IF THAT WIND HISTORY PERSISTED FOR 20 YEARS

METHOD OF COORDINATING AND STABILIZING THE DELIVERY OF WIND GENERATED ENERGY

RELATED APPLICATIONS

This application claims priority from U.S. application Ser. No. 11/242,378, filed Oct. 3, 2005, which claims priority from U.S. application Ser. No. 10/865,865, filed Jun. 14, 2004, which claims priority from U.S. Provisional Application No. 60/478,220, filed on Jun. 13, 2003.

This application claims priority from U.S. application Ser. No. 11/407,733, filed on Apr. 20, 2006, which claims priority from U.S. Provisional Application Ser. No. 60/763,577, filed on Jan. 31, 2006, and from U.S. application Ser. No. 10/857,009, filed Jun. 1, 2004, which claims priority from U.S. Provisional Application Ser. No. 60/474,551, filed on May 30, 2003.

Each of these applications is incorporated herein by reference.

FIELD OF THE INVENTION

The present invention relates to a method of coordinating and stabilizing the delivery of stored energy, such as wind generated energy stored in the form of compressed air energy.

BACKGROUND OF THE INVENTION

Generation of energy from natural sources, such as sun and wind, has been an important objective in this country over the last several decades. Attempts to reduce reliance on oil, such as from foreign sources, have become an important national issue. Energy experts fear that some of these resources, including oil, gas and coal, may someday run out. Because of these concerns, many projects have been initiated in an attempt to harness energy derived from what are called natural "alternative" sources.

While solar power may be the most widely known alternative source, there is also the potential for harnessing tremendous energy from the wind. Wind farms, for example, have been built in many areas of the country where the wind naturally blows. In many of these applications, a large number of windmills are built and "aimed" toward the wind. As the wind blows against the windmills, rotational power is created and then used to drive generators, which in turn, can generate electricity. This energy is often used to supplement energy produced by utility power plants and distributed by electrical power grids.

Wind farms are best operated when wind conditions are relatively constant and predictable. Such conditions enable a consistent and predictable amount of energy to be generated and supplied, thereby avoiding surges and swings that could adversely affect the system. The difficulty, however, is that wind by its very nature is unpredictable and uncertain. In most cases, wind speeds, frequencies and durations vary considerably, i.e., the wind never blows at the same speed over an extended period of time, and wind speeds themselves can vary significantly from one moment to another. And, because the amount of power generated by wind is mathematically a function of the cube of the wind speed, even the slightest fluctuation or oscillation in wind speed can result in a disproportionate change in wind-generated power. For example, a three-fold change in wind speed (increase or decrease) can result in a twenty-seven-fold change in wind-generated power, i.e., 3 cubed equals 27.

This is particularly significant in the context of a wind farm delivering energy to an electrical power grid, which is a giant network composed of a multitude of smaller networks. These sudden surges in one area can upset other areas and can even bring down the entire system in some cases. Because of these problems, in current systems, wind farm power outputs are often difficult to deal with and can cause problems for the entire system.

Another problem associated with wind fluctuations and oscillations relates to the peak power sensitivity of the transmission lines in the grid. When wind speed fluctuations are significant, and substantial wind power output fluctuations occur, the system must be designed to account for these variances, so that the system will have enough power line capacity to withstand the power fluctuations and oscillations. At the same time, if too much consideration is given to these peak power outputs, the system may end up being significantly over-designed, i.e., if the system is designed to withstand surges during a small percentage of the time, the power grid capacity during the greater percentage of the time may not be used efficiently and effectively.

Another related problem is the temporary loss of wind power associated with an absence of wind or very low wind speed in some circumstances. When this occurs, there may be a gap in wind power supply, which can be detrimental to the overall grid power output. This is especially important when large wind farms are used, wherein greater reliance on wind-generated power, to offset peak demand periods exists.

Because of these problems, attempts have been made in the past to store energy produced by the wind so that wind generated energy can be used during peak demand periods, and/or periods when little or no wind is available, i.e., time-shifting the energy from when it is most available to when it is most needed. Nevertheless, these past systems have failed to be implemented in a reliable and consistent manner. Past attempts have not been able to reduce the inefficiencies and difficulties, as well as the fluctuation and oscillation problems discussed above, inherent in using wind as an energy source for an extended period of time.

Notwithstanding these problems, because wind is a significant natural resource that will never run out, and is often in abundance in many locations throughout the world, there is a desire to develop a method of harnessing power generated by wind, to provide power in a manner that allows not only energy to be stored, but enables the delivery of the energy to the user or grid to be coordinated, managed and stabilized, to smooth wind power fluctuations and oscillations, while at the same time, filling in wind energy gaps prior to delivery, such that energy swings and surges that can adversely affect the user or grid can be eliminated.

SUMMARY OF THE INVENTION

The present invention relates to a method of using and storing wind generated energy and effectively coordinating, managing and stabilizing the delivery of that energy in a manner that enables wind power fluctuations and oscillations to be reduced or avoided, by smoothing and stabilizing the delivery of power to the user or grid, and avoiding sudden surges and swings which can adversely affect the power delivery system. The present method generally comprises a process that utilizes daily wind forecasts and projections to anticipate the wind conditions and characteristics for the upcoming day, and then using that data to effectively plan and develop a delivery schedule, with the objective of enabling the system to provide the longest possible periods of time where wind generated power output levels to the user or grid can remain substantially constant, such as for the upcoming 24 hour period. In this respect, the present system contemplates using various types of energy generating systems, including those that can store energy for later use, and control systems that can determine how much energy is stored and how much is being used from storage at any given time.

In one embodiment, the present system preferably comprises windmill stations that are dedicated to various uses. The first of these stations is preferably dedicated to generating energy for direct and immediate use by the end user or grid (hereinafter referred to as "immediate use stations"). The second of these windmill stations is preferably dedicated to energy storage such as by using a compressed air energy system (hereinafter referred to as "energy storage stations"). The third of these windmill stations can preferably be switched between the two (hereinafter referred to as "hybrid stations"). The invention can consist of one or more of these types.

The system is preferably designed with a predetermined number and ratio of each type of windmill station to enable the system to be both economical and energy efficient in generating the appropriate amount of energy for both immediate use and storage at any given time. In this respect, the present application incorporates by reference U.S. application Ser. No. 10/263,848, filed Oct. 4, 2002, in its entirety. These systems are preferably used in communities or facilities where there is a need for a large number of windmill stations, i.e., a wind farm, and/or access to an existing power grid, such that energy from the system can be used to supplement conventional energy sources. The present application also incorporates by reference U.S. application Ser. No. 10/857,009, filed Jun. 1, 2004, in its entirety. These systems are preferably used in circumstances where wind farms are located far from the end user community or facility or power grid in need of the energy, wherein the energy can be stored as compressed air within a pipeline system extending from the wind farm to the user or grid.

Each immediate use station preferably has a horizontal axis wind turbine (HAWT) and an electrical generator located in the nacelle of the windmill, such that the rotational movement caused by the wind is directly converted to electrical energy via the generator. This can be done, for example, by directly connecting the electrical generator to the rotational shaft of the wind turbine so that the mechanical power derived from the wind can directly drive the generator. By locating the generator downstream from the gearbox on the windmill shaft, and by using the mechanical power of the windmill directly, energy losses typically attributed to other types of arrangements can be avoided. An immediate use station can also be adapted to supply energy in other forms, such as compressed air, i.e., to drive pneumatic tools and devices.

The energy storage stations are more complex in terms of bringing the mechanical rotational energy from the above ground nacelle down to ground level as rotational mechanical energy. When compressed air systems are used, each energy storage station is preferably connected to a compressor in a manner that converts wind power to compressed air energy directly. The horizontally oriented wind turbine of each energy storage station can be adapted to have a horizontal shaft connected to a first gear box, which is connected to a vertical shaft extending down the windmill tower, which in turn, is connected to a second gear box connected to another horizontal shaft located on the ground. The lower horizontal shaft can then be connected to the compressor, such that the mechanical power derived from the wind can be converted directly to compressed air energy and stored. In another embodiment, the compressor can be located in the nacelle of the wind turbine, and a compressed air energy storage pipe can be extended down the tower, wherein the compressed air energy can be transferred down the wind turbine to the storage means, whether a tank or extended pipeline, on the ground, as will be discussed.

The compressed air from each energy storage station is preferably channeled into one or more high-pressure storage tanks or pipeline systems, as described in U.S. application Ser. No. 10/857,009, where the compressed air can be stored. Storage of compressed air allows the energy derived from the wind to be stored for an extended period of time. By storing energy in this fashion, the compressed air can be released and expanded by turbo expanders at the appropriate time, such as when little or no wind is available, and/or during peak demand periods. The released and expanded air can then drive an electrical generator, such that energy derived from the wind can be used to generate electrical power on an "as needed" basis, i.e., when the power is actually needed, which may or may not coincide with when the wind actually blows. The energy storage stations can be adapted to supply energy in other forms, such as compressed air energy, i.e., to drive pneumatic tools and devices, wherein, in such case, the compressed air energy in storage would not have to be converted into electricity first, which can help increase the efficiency of the system.

The present invention contemplates that the storage tank, pipeline system, and/or related components, and their masses, can be designed to absorb and release heat to maintain the stored compressed air at a relatively stable temperature, even during compression and expansion. For example, when large storage tanks are used, the preferred embodiment comprises using a heat transfer system made of tubing extending through the inside of each tank, wherein heat transfer fluid (such as an antifreeze) can be distributed through the tubing to provide a cost-efficient way to keep the temperature in the tank relatively stable.

The present system can also incorporate other heating systems, including heating devices that can be provided with the storage tanks that can help generate additional heat and pressure, and provide a means by which the expanding air can be prevented from freezing. Alternatively, the present invention also contemplates using a combination of solar heat, waste heat from the compressor, combustors, and low level fossil fuel power, etc., to provide the necessary heat to increase the temperature and pressure of the compressed air in the storage tank or pipeline. The pipeline, for example, can be laid out on the desert floor and painted black, which allows energy from the sun to be absorbed more efficiently.

The present system also contemplates that the cold air created by the expansion of the compressed air exhausting from the turbo-expander can be used for additional refrigeration purposes, i.e., such as during the summer where air conditioning services might be in demand. Other energy storage means, such as conventional batteries, hydraulic pressure heads, etc., can also be used in connection with the present invention.

It can be seen that the immediate use stations discussed above can be used to produce electricity directly from the windmill stations for immediate delivery to the user or power grid. On the other hand, it can be seen that the energy storage stations can be used to time shift the delivery of wind generated power, so that wind generated power can be made available to the user or power grid even at times that are not coincident with when the wind actually blows, i.e., even when little or no wind is blowing, and/or during peak demand periods. The coordination and usage of these stations enables the current system to provide continuous and uninterrupted power in a stabilized manner to the user or power grid, despite fluctuations and oscillations in wind speed, by coordinating and managing the flow of energy from the various stations.

The present system can also incorporate hybrid windmill stations that can be customized and switched between energy for immediate use, and energy for storage, i.e., a switch can be used to determine the levels of energy dedicated for immediate use and storage. In such case, the ratio between the amount of energy dedicated for immediate use and the amount dedicated for storage can be further changed by making certain adjustments, i.e., such as by using clutches and gears located on the hybrid station, so that the appropriate amount of energy of each kind can be provided. This enables the hybrid station to be customized to a given application at virtually any time, to allow the system to provide the appropriate amount of power for immediate use and energy storage, depending on wind availability and energy demand at any given moment. In one embodiment, the system can be comprised of all hybrid windmill stations, with the ability to switch between providing energy for immediate use and energy storage.

Using these types of windmill stations, the present system is better able to allocate wind-generated energy to either immediate delivery to the user or grid, or energy storage and usage, depending on the wind conditions and needs. For example, the hybrid stations can be used in conjunction with the immediate use and energy storage stations to provide the proper ratio of power which would enable large wind farms to be designed in a more flexible and customized manner, e.g., so that the appropriate amount of energy can be delivered to the user or grid at the appropriate time to meet the particular demands of the system. In short, using a combination of the different types of windmill stations enables a system to be more specifically adapted and customized so that a constant supply of power can be provided for longer periods of time.

The wind patterns in any particular location can change from time to time, i.e., from one season to another, from one month to another, and, most importantly, from day to day, hour to hour, and minute to minute. Accordingly, these fluctuations and oscillations must be dealt with in conjunction with energy storage for the system to provide continuous power at a more constant rate. For this reason, the present invention contemplates that daily wind forecasts can be obtained for the particular area where the windmill stations are located, to project the wind conditions and characteristics for each upcoming period of time, such as the next day or 24 hour period. These wind forecasts are intended to be based on the latest weather forecast technologies available to approximate as closely as possible the actual expected wind conditions over the course of the upcoming period, and used to forecast or predict the amount of power that could be generated by the wind during those times. While these forecasts may not be entirely accurate, they can provide a very close approximation of the expected wind conditions, sufficient for purposes of planning and developing the wind delivery schedules that will enable the system to continually operate.

Once each daily forecast is obtained, the present method preferably contemplates using the data to formulate an energy delivery schedule for the upcoming period, based on the forecast or prediction, with the objective of creating the longest possible periods of time during which the wind generated power output level to the user or grid can remain substantially constant. For example, in the preferred embodiment, it is desirable to have no more than about three constant power output periods during any given day, such that there would be less than three changes in the rate of power being supplied to the user or grid on any given day (although up to as many as 7 or so constant power periods can be provided if necessary).

By enabling the system to provide longer periods when the wind generated power output is substantially constant, and fewer changes in the amount of the power output, the present system enables power surges and swings, such as those caused by wind speed fluctuations and oscillations, to be reduced and in some cases eliminated altogether.

The manner in which the daily schedules are planned and carried out preferably utilizes the windmill stations discussed above, as well as a valve control system for controlling the amount of energy that is stored and used from storage. The system contemplates being able to control the amount of wind generated power output levels at any given time by implementing an appropriate number of immediate use and energy storage stations for generating energy, and/or by converting the appropriate number of hybrid stations, and then controlling how much energy is supplied directly, and how much is provided via energy storage, using compressors and expanders, at any given moment in time. The controls are also necessary to maintain proper levels of energy in storage, based on continually updating the wind forecasts, so that the system never runs out of stored energy. Based on wind forecasts, it is possible during any given day to anticipate the need for additional energy in storage (such as when it is expected that the power needed may exceed the power supplied during the upcoming 24 hour period), and when it is not needed (such as when it is expected that there will be sufficient wind to provide direct energy during the next 24 hour period).

BRIEF DESCRIPTION OF THE DRAWINGS

FIG. 10 is a chart showing the daily delivery schedules for the three days, indicating the number of immediate use and energy storage windmills that were operational, based on the settings of the hybrid stations, and the number of storage tanks used and the cost of generating the power each day;

DETAILED DESCRIPTION OF THE INVENTION

The present application incorporates by reference the subject matter of U.S. application Ser. No. 10/263,848, filed on Oct. 4, 2002, entitled "Method and Apparatus for Using Wind Turbines to Generate and Supply Uninterrupted Power to Locations Remote from the Power Grid," which discusses the windmill stations, storage, heating and other apparatuses and methods that are capable of being used with the present invention. The present application also incorporates by reference the subject matter of U.S. application Ser. No. 10/857,009, filed by applicants on Jun. 1, 2004, 2003, entitled "A Method of Storing and Transporting Wind Generated Energy Using a Pipeline System," which discusses the use of a pipeline system for storing and transporting wind generated energy that is capable of being used in connection with the present invention.

The apparatus portion of the present invention preferably comprises different types of windmill stations, including a first type having a horizontal axis wind turbine that converts rotational mechanical power to electrical energy using an electrical generator and providing energy for immediate use (hereinafter referred to as "immediate use stations"), a second type having a horizontal axis wind turbine that converts mechanical rotational power to compressed air energy for energy storage (hereinafter referred to as "energy storage stations"), and a third type that combines the characteristics of the first two in a single windmill station having the ability to convert mechanical rotational power to electrical energy for immediate use and/or energy storage (hereinafter referred to as "hybrid stations"). The present system is preferably designed to use and coordinate at least one of these different types of windmill stations so that a predetermined portion of the wind generated energy can be dedicated to energy storage and/or for immediate use. Systems that use compressed air to drive pneumatic tools and devices, without converting energy into electricity first (for both immediate use and storage), and those using other forms of storage, such as pipelines, batteries, hydraulic pressure, etc., are also contemplated.

Figure 1A:
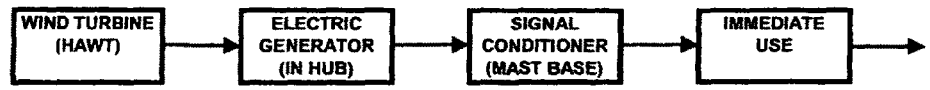
FIG. 1a shows a flow-chart of a horizontal axis wind turbine system of the present invention dedicated to generating energy for immediate use.

The following discussion describes each of the three preferred types of windmill stations, followed by a description of how to coordinate the windmill stations for any given application:

A. Immediate Use Stations:

FIG. 1a shows a schematic flow diagram of a preferred immediate use station. The diagram shows how mechanical rotational power generated by a windmill is converted to electrical power and supplied as electrical energy for immediate use. Energy derived from the wind can be converted to electrical power more efficiently when the conversion is direct, e.g., the efficiency of wind generated energy systems can be enhanced by directly harnessing the mechanical rotational movement caused by the wind as it blows onto the windmill blades to directly generate electricity.

Like conventional windmill devices used for creating electrical energy, the present invention contemplates that each immediate use station will comprise a windmill tower with a horizontal axis wind turbine located thereon. The tower is preferably erected to position the wind turbine at a predetermined height, and each wind turbine is preferably "aimed" toward the wind to maximize the wind intercept area, as well as the wind power conversion efficiency of the station. A wind turbine, such as those made by various standard manufacturers, can be installed at the top of the tower, with the windmill blades or fans positioned about a horizontally oriented rotational shaft.

In this embodiment, a gearbox and an electrical generator are preferably located in the nacelle of the windmill such that the mechanical rotational power of the shaft can directly drive the generator to produce electrical energy. By locating the electrical generator directly on the shaft via a gearbox, mechanical power can be more efficiently converted to electrical power. The electrical energy can then be transmitted down the tower via a power line, which can be connected to other lines or cables that feed power from the immediate use station to the grid or other user.

In other embodiments, the wind energy can be converted to other forms of energy, depending on the end user requirements. For example, to power an industrial park having pneumatic tools and equipment, compressors can be provided to convert the wind energy from the windmill stations into compressed air energy, which can then be used immediately by the industrial park. This can be done by using the electricity generated by the generator to drive the compressors, or, preferably, the mechanical energy from the windmills can be harnessed directly to operate the compressors, in which case, the actual windmill tower can be set up like the energy storage windmill towers described below.

The present invention contemplates that the immediate use stations are to be used in connection with other windmill stations that are capable of storing wind energy for later use as described in more detail below. This is because, as discussed above, the wind is generally unreliable and unpredictable, and therefore, having only immediate use stations to supply energy for immediate use will not allow the system to be used to provide power output at a constant rate. Accordingly, the present invention contemplates that in wind farm applications where multiple windmill stations are installed, at least one energy storage station would preferably be installed and used.

B. Energy Storage Stations.

Figure 1B:
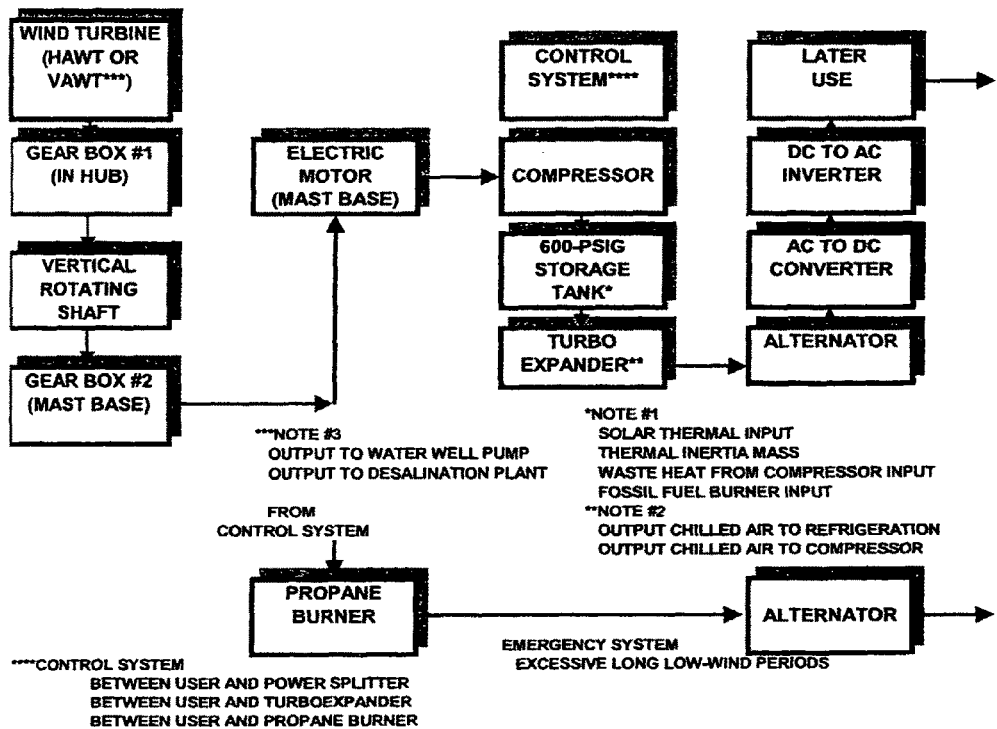
FIG. 1b shows a flow-chart of a modified horizontal axis wind turbine system of the present invention dedicated to storing energy in a compressed air energy system.

FIG. 1b shows a schematic flow chart of an energy storage windmill station. This station preferably comprises a conventional windmill tower and horizontal axis wind turbine as discussed above in connection with the immediate use stations. Likewise, the wind turbine is preferably located at the top of the windmill tower and capable of being aimed toward the wind as in the previous design. A rotational shaft is also extended from the wind turbine for conveying power.

Unlike the previous design, however, in this embodiment, energy derived from the wind is preferably extracted at the base of the windmill tower for energy storage. As shown in FIG. 1b, a first gearbox is preferably located adjacent the wind turbine in the nacelle of the windmill, which can transfer the rotational movement of the horizontal drive shaft to a vertical shaft extending down the windmill tower. In the preferred embodiment, at the base of the tower, there is preferably a second gearbox designed to transfer the rotational movement of the vertical shaft to another horizontal shaft located on the ground, which is then connected to a compressor. The mechanical rotational power from the wind turbine on top of the tower can, therefore, be transferred down the tower, and converted directly to compressed air energy, via the compressor located at the base of the tower or somewhere nearby. A mechanical motor in the compressor forces compressed air energy into one or more high pressure storage tanks or pipeline system located on the ground. With this arrangement, each energy storage station is able to convert mechanical wind power directly to compressed air energy, which can be stored for later use, such as during peak demand periods, and/or when little or no wind is available. In other embodiments, the energy can be stored in other storage means, such as batteries, hydraulic pressure, pipelines, etc. When batteries are used, the windmill tower can be set up like the immediate use windmill towers described above.

In another embodiment, the compressor is preferably located in the nacelle of the wind turbine and has mechanical gears associated with the wind turbine generator to produce compressed air energy using wind energy. The compressed air generated by the compressor is then preferably transmitted through a vertical pipe extending down the tower and into an associated compressed air storage means, such as a tank or pipeline, without converting the compressed air into electricity first. This avoids switching the energy back and forth between types which can result in losses and therefore inefficient use of energy. This is a useful configuration such as in the case of using a turbo compressor and turbo expander to deliver compressed air energy at the end user site without converting the wind energy to electrical energy first.

The energy storage portion of the present system preferably comprises means for storing the compressed air energy, such as in storage tanks or a pipeline system. Reference can be made to U.S. application Ser. No. 10/263,848, filed on Oct. 4, 2002, for additional information regarding the storage tank, heating and other apparatuses and methods that are capable of being used in connection with the present invention, and to U.S. application Ser. No. 10/857,009, filed on Jun. 1, 2004, entitled "A Method of Storing and Transporting Wind Generated Energy Using a Pipeline System," for additional information regarding the pipeline system for storing and transporting wind generated energy which can be used in connection with the present invention. The storage facility is preferably located in proximity to the energy storage stations, such that compressed air can be conveyed into storage without significant pressure losses.

Various size storage facilities can be used. The present system contemplates that the sizing of the storage facilities can be based on calculations relating to a number of factors. For example, as will be discussed, the volume size of the storage facility can depend on the number and ratio of energy storage and immediate use stations that are installed, as well as other factors, such as the size and capacity of the selected wind turbines, the capacity of the selected compressors, the availability of wind, the extent of the energy demand, etc.

When applicable, any of the many conventional means of converting the compressed air into electrical energy can be used. In the preferred embodiment, one or more turbo-expanders are used to release the compressed air from storage to create a high velocity airflow that can be used to power a generator to create electrical energy. This electricity can then be used to supplement the energy supplied by the immediate use stations. Whenever stored wind energy is needed, the system is designed to allow compressed air in storage to be released through the turbo-expanders. As shown in FIG. 1b, the turbo-expanders preferably feed energy to an alternator, which is connected to an AC to DC converter, followed by a DC to AC inverter, and then followed by a conditioner to match impedances to the user circuits. Again, in other embodiments, the compressed air energy may not need to be converted into electricity, i.e., the compressed air energy can be released as necessary to drive pneumatic tools and equipment at an industrial park or facility. It can also be released to produce super chilled air, which can then be used in an HVAC system.

The present invention preferably contemplates that the storage facilities be designed to absorb and release heat to maintain the stored air at a relatively stable temperature, even during compression and expansion. For example, when large storage tanks are used, the preferred embodiment preferably comprises using a heat transfer system made of thin walled tubing extending through the inside of each tank, wherein heat transfer fluid (such as an antifreeze) can be distributed through the tubing to provide a cost-efficient way to keep the temperature in the tank relatively stable. The tubing preferably comprises approximately 1% of the total area inside the tank, and is preferably made of copper or carbon steel material. They also preferably contain an antifreeze fluid that can be distributed throughout the inside of the storage tank, wherein the tubing acts as a heat exchanger, which is part of the thermal inertia system. The storage tanks are preferably lined by insulation to prevent heat loss from inside.

The present system can also incorporate other heating systems, including heating devices that can be provided on top and inside the storage tanks that can help generate additional heat and pressure energy, and provide a means by which the expanding air can be prevented from freezing. In some cases, although not in the preferred system, the present invention can use a combination of solar heat, waste heat from the compressor, combustors, low-level fossil fuel power, etc., to provide the necessary heat to increase the temperature and pressure of the compressed air in the storage tank. In the pipeline storage embodiment, the pipeline can be laid onto the floor of a desert, and painted black, such that it absorbs the heat from the sun.

The present system also contemplates that the cold air created by the expansion of the compressed air exhausting from the turbo-expander can be used for additional refrigeration and HVAC purposes, i.e., such as during the summer where air conditioning services might be in demand.

Figure 2A:
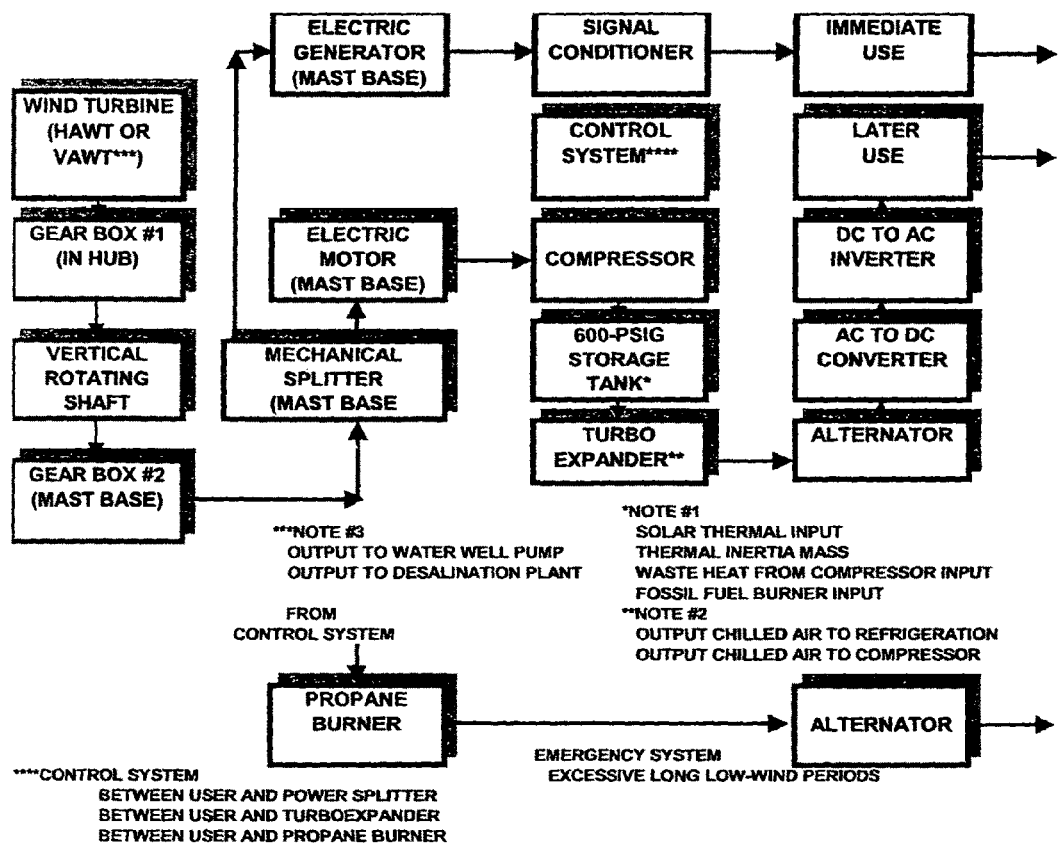
FIG. 2a shows a flow-chart of a hybrid horizontal axis wind turbine system of the present invention for generating electricity between immediate use and energy storage.

C. Hybrid Stations:

FIG. 2a shows a hybrid station. The hybrid station is essentially a single windmill station that comprises certain elements of the immediate use and energy storage stations, with a splitting mechanism that allows the wind power to be allocated between power for immediate use and energy for storage, depending on the needs of the system.

Like the two stations discussed above, a conventional windmill tower is preferably erected with a conventional horizontal axis wind turbine located thereon. The wind turbine preferably comprises a horizontal rotational shaft having the ability to convey mechanical power directly to the converters.

Like the energy storage station, the hybrid station is preferably adapted so that wind energy can be extracted at the base of the windmill tower. As schematically shown in FIG. 2a, the wind turbine preferably has a rotational drive shaft connected to a first gearbox located in the nacelle of the windmill, wherein horizontal rotational movement of the shaft can be transferred to a vertical shaft extending down the tower. At the base of the tower, there is preferably a second gearbox designed to transfer the rotational movement of the vertical shaft to another horizontal shaft located at the base.

At this point, as shown in FIG. 2a, a mechanical power splitter can be provided. The splitter, which will be described in more detail below, is designed to split the mechanical rotational power of the lower horizontal shaft, so that an appropriate amount of wind power can be transmitted to the desired downstream converter, i.e., it can be adjusted to send power to an electrical generator for immediate use, and/or a compressor for energy storage.

Downstream from the mechanical splitter, the hybrid station preferably has, on one hand, a mechanical connection to an electrical generator, and, on the other hand, a mechanical connection to a compressor. When the mechanical splitter is switched fully to the electrical generator, the mechanical rotational power from the lower horizontal shaft is transmitted directly to the generator via a geared shaft. This enables the generator to efficiently and directly convert mechanical power to electrical energy, and for the electrical power to be transmitted to the user for immediate use.

On the other hand, when the mechanical splitter is switched fully to the compressor, the mechanical rotational power from the lower horizontal shaft is transmitted directly to a compressor, to enable compressed air energy to be stored, such as in a high-pressure storage tank. This portion of the hybrid station is preferably substantially similar to the components of the energy storage station, insofar as the mechanical power generated by the hybrid station is intended to be directly converted to compressed air energy, wherein the stored energy can be released at the appropriate time, via one or more turbo-expanders. Like the previous embodiment, a high-pressure storage tank or pipeline system is preferably located in close proximity to the windmill station so that compressed air energy can be efficiently stored in the tank for later use.

In an alternate embodiment, both a compressor and electrical generator can be located in the nacelle of the wind turbine. A switch or splitter can then be provided which apportions the rotational energy produced by the wind to the compressor or generator or both. This can be done with a switch that either connects or disconnects the compressor and generator to the wind turbine's power, or apportions a predetermined amount of energy to both, such as by using a mechanical gear system similar to the one described below.

As will be discussed, the hybrid stations are preferably incorporated into large wind farm applications, and installed along with other stations for immediate use and energy storage. In such case, the compressor on each hybrid station can be connected to centrally located storage facilities or a pipeline, such that a plurality of energy storage and hybrid stations can feed compressed air into them. In fact, the system can be designed so that all of the hybrid stations and the energy storage stations can be connected to a single energy storage facility or pipeline.

The mechanical power splitter, which is adapted to split the mechanical power between power dedicated for immediate use and power dedicated for energy storage, and can comprise multiple gears and clutches so that mechanical energy can be conveyed directly to the converters, whether a compressor or generator. In one embodiment, the mechanical splitter comprises a large gear attached to the lower horizontal drive shaft extending from the bottom of the station, in combination with additional drive gears capable of engaging and meshing with the large gear. A first clutch preferably controls each of the additional drive gears to move them from a first position that engages (and meshes with) the large gear, to a second position that causes them not to engage the large gear, and vice versa. This way, by operation of the first clutch, an appropriate number of additional drive gears can be made to engage (and mesh with) the large gear, depending on the desired distribution of mechanical power from the lower drive shaft to the converters.

For example, one system can have one large gear and five additional drive gears, wherein the first clutch can be used to enable the large gear to engage, at any one time, one, two, three, four or five of the additional drive gears. In this manner, the first clutch can control how many of the additional drive gears are activated and therefore capable of being driven by the large gear (which is driven by the horizontal drive shaft), to determine the ratio of mechanical power to be conveyed to the appropriate energy converter. That is, if all five additional drive gears are engaged with the large gear, each of the five additional drive gears will be capable of conveying one-fifth or 20% of the overall mechanical power to the energy converters. If only three of the additional drive gears are engaged with the large gear, then each engaged additional drive gear will convey one-third or 33.33% of the mechanical power generated by the windmill. If two drive gears engage the large gear, each will convey one half or 50% of the transmitted power, etc.

The mechanical splitter of the present invention preferably has a second clutch to enable each of the additional drive gears to be connected downstream to either an electrical, generator (which generates energy for immediate use) or an air compressor (which generates compressed air energy for energy storage). By adjusting the second clutch, therefore, the mechanical power conveyed from the large gear to any of the additional drive gears can be directed to either the electrical generator or compressor. This enables the amount of mechanical power supplied by the windmill station to be distributed and allocated between immediate use and energy storage on an individual, customized and adjustable basis. That is, the amount of power distributed to each type of energy converter can be made dependent on the adjustments that are made by the two clutches, which determine how many additional drive gears engage the large gear, and to which energy converter each engaged additional drive gear is connected. Those connected to the electrical generator will generate energy for immediate use, and those connected to the compressor will generate energy for storage.

Based on the above, it can be seen that by adjusting the two clutches of the mechanical power splitter mechanism, the extent to which energy is dedicated for immediate use and energy storage can be adjusted and allocated. For example, if it is desired that 40% of the mechanical power be distributed to energy for immediate use, and 60% of the mechanical power be distributed to energy for storage, the first clutch can be used to cause all five of the additional drive gears to be engaged with the large gear, while at the same time, the second clutch can be used to cause two of the five additional drive gears (each providing 20% of the power or 40% total) to be connected to the electrical generator, and three of the five additional drive gears (each providing 20% of the power or 60% total) to be connected to the compressor. This way, the mechanical splitter can divide and distribute the mechanical power between immediate use and energy storage at a predetermined ratio of 40/60, respectively.

In another example, using the same system, if it is desired that all of the mechanical power be distributed to immediate use, the first clutch can be used to cause the large gear to engage only one of the additional drive gears, and the second clutch can be used to connect the one engaged additional drive gear to the electrical generator, i.e., so that all of the mechanical power generated by the windmill station will be conveyed for immediate use. Likewise, if it is desired that all of the mechanical power be distributed to energy storage, the second clutch can be used to connect the one engaged additional drive gear to the compressor, i.e., so that all of the mechanical power generated by the windmill station will be conveyed for storage.

The present system contemplates that any number of additional drive gears can be provided to vary the extent to which the mechanical power can be split. It is contemplated, however, that having five additional drive gears would likely provide enough flexibility to enable the hybrid station to be workable in most situations. With five additional drive gears, the following ratios can be provided: 50/50, 33.33/66.66, 66.66/33.33, 20/80, 40/60, 60/40, 80/20, 100/0, and 0/100.

By using the clutches on the mechanical power splitter, each hybrid station can be adjusted at different times of the day to supply a different ratio of power between immediate use and energy storage. As will be discussed, depending upon the power demand and wind availability forecasts, it is contemplated that different ratios may be necessary to provide a constant amount of power to the user for extended periods of time, despite unreliable and unpredictable wind conditions. This system is designed to enable those ratios to be easily accommodated.

Other systems for splitting power are also contemplated. For example, when a system that drives only pneumatic tools and equipment is contemplated, the hybrid stations can be adapted to supply compressed air energy without having to convert any of the energy into electricity. In such case, the system can be adapted to route the mechanical energy from the windmill stations to one or more compressors, wherein the energy can be converted into compressed air energy, and then used immediately and/or stored first. In the case of a hybrid station, a splitter can be adapted to divert the mechanical energy to two different compressors, one compressor used to generate compressed air energy for immediate use (such as at an industrial park or facility), and another compressor to generate compressed air energy into storage (for later use by the same industrial park or facility). Likewise, a splitter can be located down stream from a single compressor, wherein a portion of the compressed air energy can be split, i.e., some diverted and used immediately, and some stored for later use. This can be done with a Y splitter in the pipeline, for example, or a splitter with a valve that controls how much compressed air energy travels in each direction.

D. Control and Valve Mechanism:

The present system preferably comprises a system to control the operation of the windmill stations, the clutches on the hybrid stations, the amount of energy or compressed air being fed into and out of storage, the operation of the compressors and generators, the operation of the turbo-expanders, etc. The control system is preferably able to set the total number of windmill stations that are to be in operation at any given time, including how many immediate use stations are operated, how many energy storage stations are operated, and how many hybrid stations are operating in immediate use mode, and how many are operating in energy storage mode. This way, at any given time, the total amount of energy to be supplied by the system, and how the energy is allocated between immediate use and energy storage, can be accurately controlled and adjusted.

For example, if a system has a total of 50 windmill stations, with 20 immediate use, 20 energy storage, and 10 hybrid stations, the operator can determine how many stations will be dedicated for immediate use, on one hand, and storage, on the other hand, by using the control system to determine how many of the immediate use and energy storage stations will be in operation, and how many of the hybrid stations will be set to either immediate use or energy storage mode. For example, if it is determined that power from 28 immediate use windmill stations are needed for a particular period, the system can run all 20 of the immediate use stations, and convert 8 of the 10 hybrid stations to immediate use mode. At the same time, if only 16 of the energy storage stations are needed during the same period, 16 of them can be placed in operation, and the other 4 can be shut down, or the energy supplied by them can be disconnected or vented.

The control system is also preferably designed to be able to maintain the level of energy or compressed air energy in storage at an appropriate level, by regulating the flow of energy or compressed air into and out of storage. Compressed air is introduced into storage via compressors, and released from storage, such as via turbo-expanders.

Figure 2B:
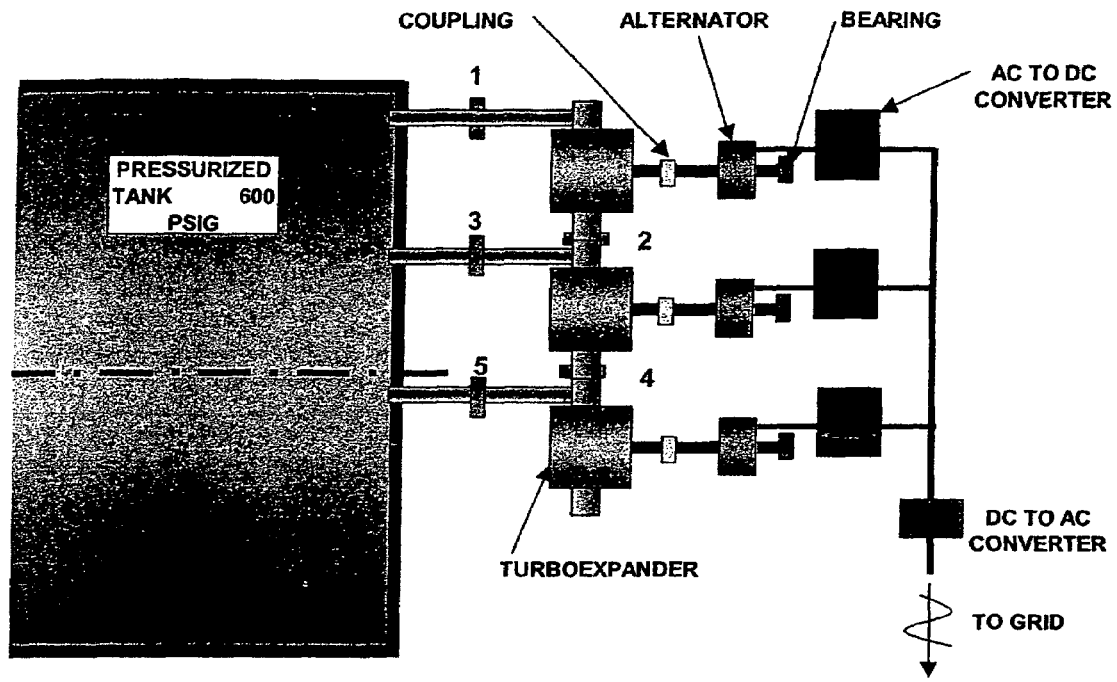
FIG. 2b shows an example of a pressure release valve system of the present invention.

On the releasing end, a valve system, like the one shown in FIG. 2b, can be provided to allow a predetermined amount of compressed air to be released, such as through the turbo-expanders at any given moment. FIG. 2b shows an example of a storage tank with three couplings attached to three turbo-expanders, wherein valves can be used to allocate an appropriate amount of air through the turbo-expanders. The chart shows 5 different valve sequences, each associated with a particular pressure amount in the storage tank.

Valve sequence A is suited for 600 psig. According to this sequence, only valve numbers 3 and 5 are closed, and all others are open. In this manner, air flowing through valve 1 enters into the first turbo-expander, and can be converted to electrical energy, via the first alternator. Also, because valves 2 and 4 are open, some of the compressed air enters into the second and third turbo-expanders, and can be converted to electrical energy via the second and third alternators. Because valves 3 and 5 are closed, only air flowing through valve 1 is used. In certain embodiments, the compressed air energy can be released to drive pneumatic equipment, wherein the turbo-expanders would not be required to convert energy into electricity.

Valve sequence B is suited for 300 psig. According to this sequence, only valve 3 is open, and the other release valves, i.e., 1 and 5, are closed. In this manner, air flowing through valve 3 enters into the second turbo-expander, and can be converted to electrical energy via the second alternator. Also, because valve 4 is open and valve 2 is closed, some of the compressed air can enter the third turbo-expander, and be converted to electrical energy via the third alternator. The first alternator remains unused because valves 1 and 2 are closed.

Valve sequence C is suited for 100 psig. According to this sequence, only one valve, i.e., number 5, is open. In this manner, air flowing through valve 5 enters into the third turbo-expander, and can be converted to electrical energy via the third alternator. The first and second turbo-expanders and alternators remain unused.

When there is no pressure in the tank (see valve sequence D), the valves are closed, in which case compressed air energy introduced into the tank from the compressors can build up over time, to help increase pressure in the tank. Similar controls are preferably used in connection with the compressors to enable the tank to be filled, i.e., to determine the rate at which compressed air will enter into storage via the compressors. The controls preferably enable the amount of pressure in the tank to be maintained and moderated. A pipeline can also be used.

The controls can also be used to operate the heat exchangers that are used to help control the temperature of the air in the tank. The controls determine which heat exchangers are to be used at any given time, and how much heat they should provide to the compressed air in the storage tanks.

The control system preferably has a microprocessor that is pre-programmed so that the system can be run automatically, based on the input data provided for the system, as will be discussed. The present invention contemplates that an overall system comprising immediate use, energy storage and hybrid stations can be developed and installed, wherein depending on the demands that are placed on the system by the area of intended use, a predetermined number of immediate use, energy storage and hybrid stations, can be in operation at any one time. This enables the present system to be customized and adapted to accommodate various wind forecasts during different times of the year, where wind conditions can vary significantly.

E. Method:

The present method will now be discussed using an example, based on actual wind conditions found at a site in Kansas during November of 1996 provided by Kansas Wind Power LLC. This period was selected because it contained wind histories that were varied enough to show how the present method can be applied in different circumstances.

Figure 3:
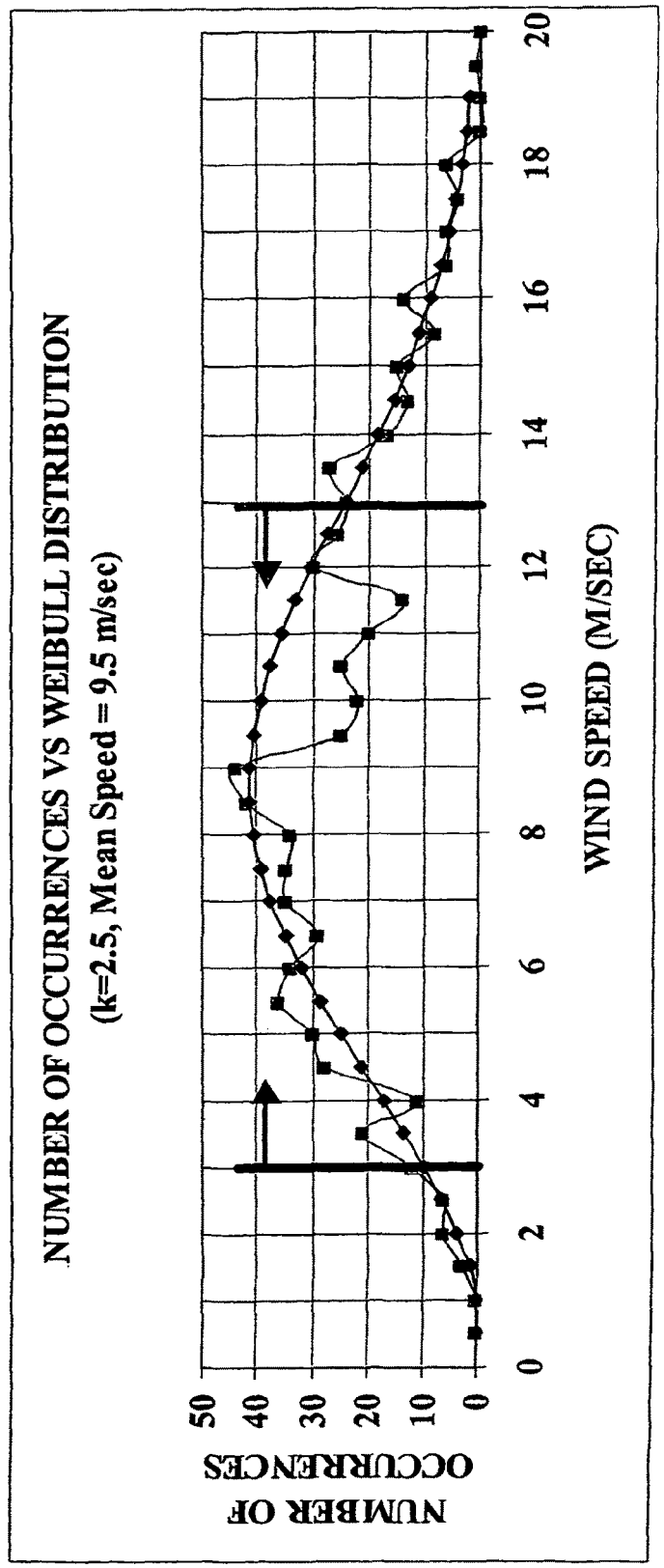
FIG. 3 shows a wind histogram for a location in Kansas during the month of November 1996.

FIG. 3 shows what is commonly called a wind histogram for the site. This chart represents an actual wind history taken at an actual location. In general, this chart shows the average number of times or occurrences the wind reached a certain speed (when measured at hourly intervals) during the month of November 1996. The wind history is designed to enable a study to be made of the average wind speeds at any given location, during any given time, from one season of the year to another.

This information can be useful, for example, in helping to formulate a solution for the entire year, which can be based on the best and worst case scenarios presented by the studies. FIG. 3 shows that the peak number of occurrences for any particular wind speed measurement was about 43, which occurred when the wind velocity reached about 9 meters per second. Stated differently, during the month of November, when measured every hour, the wind speed was about 9 meters per second more often than it was at any other speed, i.e., for a time estimated to equal about 43 hours (43 occurrences multiplied by one hour intervals equals 43 hours). Another way to look at this is that the wind was blowing an average of about 9 meters per second during an average of about 43 measurements taken at hourly intervals during the month.

The chart also shows that the wind speed was below 2 meters per second for only a few occurrences during the month. Likewise, the chart shows that the wind speed was above 18 meters per second maybe once. Stated differently, what the chart shows is that the wind blew at below 2 meters per second and above 18 meters per second for only a few hours during the entire month of November, which is helpful in determining the proper equipment and method to be used in connection with the site.

What this also means is that depending on what kind of wind turbines are selected, the chart can predict the amount of time that the wind turbines would be operational and functional during the month to produce energy. For example, if it is assumed that the wind turbines that are selected are designed to operate only when the wind speed is between 3 meters per second and 15 meters per second, due to efficiency and safety reasons, it can be predicted that during any given day during the month of November those wind turbines would be operational for most, but not all, of the time.

In an actual application, more than one month will have to be investigated and studied. Indeed, such a determination generally comprises a cost verses benefit analysis, and energy efficiency study, that takes into account the availability of wind during the worst and best case scenarios over the course of an entire year, and the demands that are likely to be placed on the system at that location year round.

The amount of wind generated power produced by the wind turbines during the above mentioned period will then depend on the wind speed at any given time during the period. In general, the wind power to be derived by a wind turbine is assumed to follow the equation:

$$P = C_1 * 0.5 * Rho * A * U^3$$

Where
$C_1$=Constant (which is obtained by matching the calculated power with the dimensions of the wind turbine area and wind speed performance)
Rho=Density of air
A=Area swept by wind turbine rotors
U=Wind Speed This means that the amount of wind power generated by the wind is proportional to the cube of the wind speed. Accordingly, in a situation where the wind turbines are fully operational within the velocity range between 2 meters per second and 18 meters per second, the total amount of wind power that can be generated will be a direct function of the total wind speed between those ranges.

On the other hand, various wind turbines are designed so that the wind power output remains relatively constant during certain high wind velocity ranges. This can result from the windmill blades becoming feathered at speeds above a certain maximum. For example, certain wind turbines may function in a manner where within a certain velocity range, i.e., between 13 and 20 meters per second, the wind power generated remains constant despite changes in wind speed. Accordingly, in the above example, during a period where the wind speed is between 13 meters and 18 meters per second, the amount of wind power generated by the wind turbine would be equal to the power generated when the wind speed is 13 meters per second. Moreover, many wind turbines are designed so that when the wind speed exceeds a maximum limit, such as 15 meters per second, the wind turbines will shut down completely, to prevent damage due to excess wind speeds. Accordingly, the total amount of energy that can be generated by a particular windmill should take these factors into consideration.

FIG. 3 also compares the actual number of occurrences with averages determined by the Weibull distribution over a period of time. In this respect, it should be noted that wind histograms for wind speeds are typically statistically described by the Weibull distribution. Wind turbine manufacturers have used the Weibull Distribution association with the "width parameter" of k=2.0, although there are sites wherein the width parameter has attained a value as high as k=2.52.

While it is desirable to know how often, on the average, certain wind speeds actually occur during the year, it is also important for purposes of the present invention to know when the various wind speeds will occur during the day, i.e., forecasted on a daily basis, and the magnitude of those wind speeds, so that they can be used to formulate daily energy delivery schedules, which is one of the goals of the present invention. To develop a system that can be applied on a daily basis, it is necessary to obtain daily wind speed forecasts and predictions in advance of the upcoming day, to enable a plan or schedule to be established which can be applied the next day.

Figure 4:
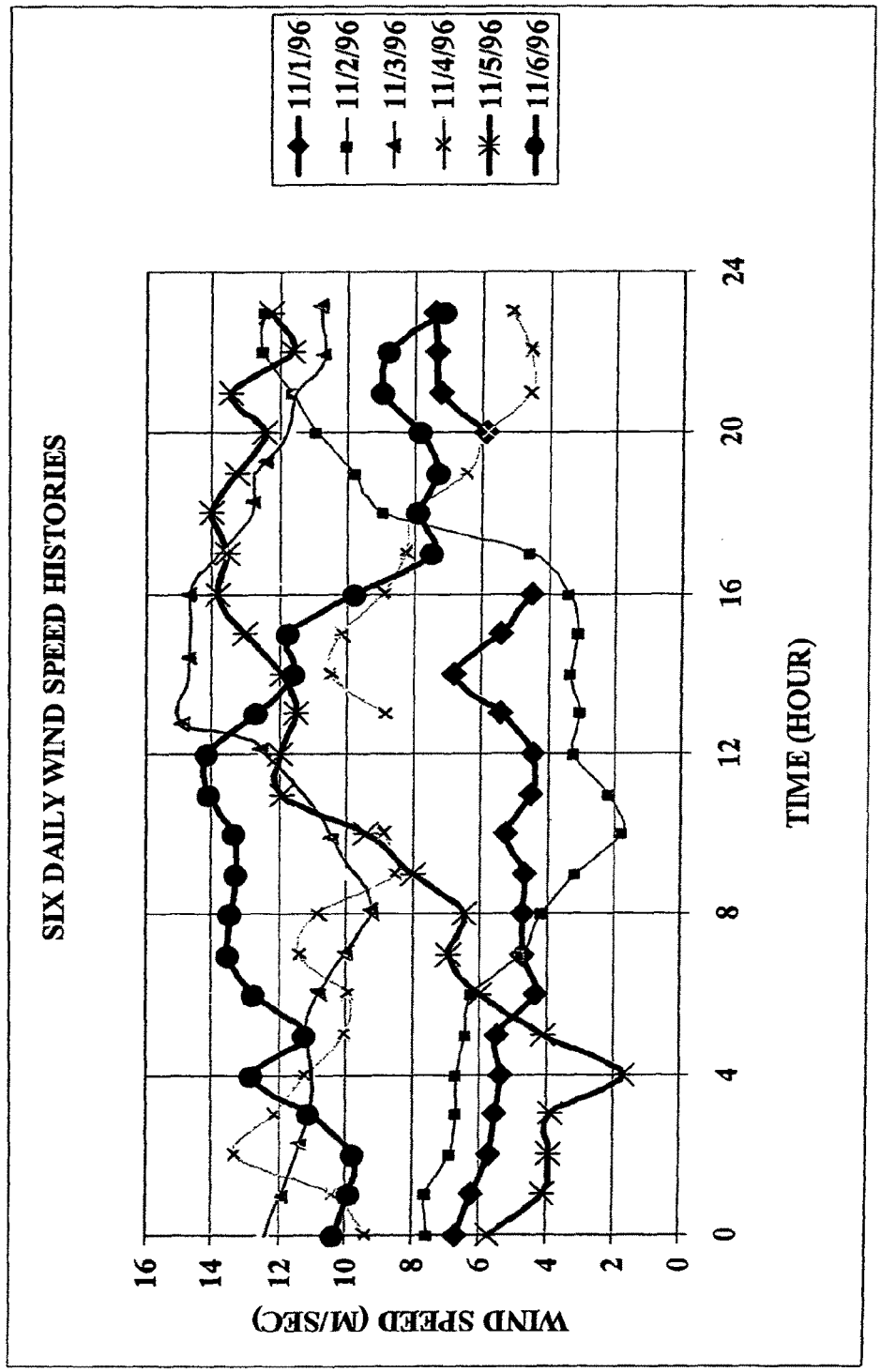
FIG. 4 shows six daily wind histories for the period between Nov. 1 and Nov. 6, 1996 at the same Kansas site.

In this respect, FIG. 4 shows daily wind histories that have occurred during a particular week in the same November time frame at the same site. FIG. 4 shows a compilation of measurements taken over a period extending from Nov. 1, 1996 to Nov. 6, 1996. This particular chart shows the wind speeds that were measured at hourly intervals throughout each day during that period.

The line that represents November 1, for example, starts after midnight with the wind blowing slightly under 7 meters per second and ends at before midnight with the wind blowing slightly under 8 meters per second. During that day, the wind fluctuated very little, with some of the lowest measurements, of about 4 meters per second, occurring in the morning hours, with a peak (spike) of about 7 meters per second occurring at about 2:00 p.m. The wind speeds then increased toward midnight.

The line that represents November 2, on the other hand, shows the wind to be more varied. The wind starts just after midnight at slightly below 8 meters per second, and begins to slow down to a low of about 2 meters per second at about 10:00 a.m. and continues at a low level. Then beginning at about 5:00 p.m., the wind starts to pick up, ending the day with wind speeds of close to 13 meters per second by midnight.

The next day, November 3, the wind continues to stay relatively high, while fluctuating up and down, reaching a low of about 9 meters per second at about 8 a.m., and reaching a peak of about 15 meters per second at about 1 p.m. On this day, the wind began after midnight at slightly below 13 meters per second, and ended with wind speeds of slightly below 11 meters per second by midnight.

On November 4, the wind continues to fluctuate, reaching a peak of about 13 meters per second, but begins to subside, reaching a speed of about 5 meters per second by midnight.

On November 5, the day begins shortly after midnight with winds reaching as low as 2 meters per second, but then begins to increase dramatically, with winds reaching a peak of about 14 meters per second by about 4 p.m. The wind speed continues to stay relatively high and reaches about 12 meters per second at midnight.

On the next day, the wind fluctuates again, reaching another peak of about 14 meters per second at about noon, and then begins to subside, reaching a low of about 7 meters per second by midnight.

What this chart tracks are the wind speeds that actually occurred during the first week of November 1996 at the site. In the present invention, however, wind speed forecasts are obtained for a particular site, so that each day's anticipated wind speeds are predicted at least one day in advance. That is, while FIG. 4 shows examples of wind histories, the present invention contemplates using wind speed forecasts, which are similar in content to the histories, except that they are projections for the future, not records of the past. Such forecasts can be developed from data obtained from weather bureaus and other data resources, and using the latest weather forecasting technologies. The present invention contemplates that relatively accurate forecasts can be developed, particularly when made within 24 hours before the forecasted day.

Once the data is obtained, the wind speed forecasts that are similar to the wind histories for the upcoming day are prepared, which can be used to determine the daily power delivery schedules that should be implemented to maintain a relatively constant power output level for the longest possible periods during the upcoming 24 hour period. Again, the objective is to deliver power to the user or power grid using a reduced number of constant power output level periods per day, i.e., preferably three or less, although up to about 7 or more can be acceptable as will be discussed. This allows for the number of times that the delivery output level will have to be changed to be minimized, thereby placing less stress and work on the switching mechanism.

For purposes of this example, three of the six days in November 1996, i.e., November 1, 5 and 6, have been chosen for their extreme varied wind speeds, which are helpful in showing various aspects of the present method. Days where wind speeds vary greatly require the use of stored energy to smooth the delivery of energy to the user or grid, whereas days that have fewer wind speed variations typically do not. These three days will be studied and plotted to show how the present method can be applied to determine a daily delivery schedule that can satisfy the stated objectives.

Figure 5:
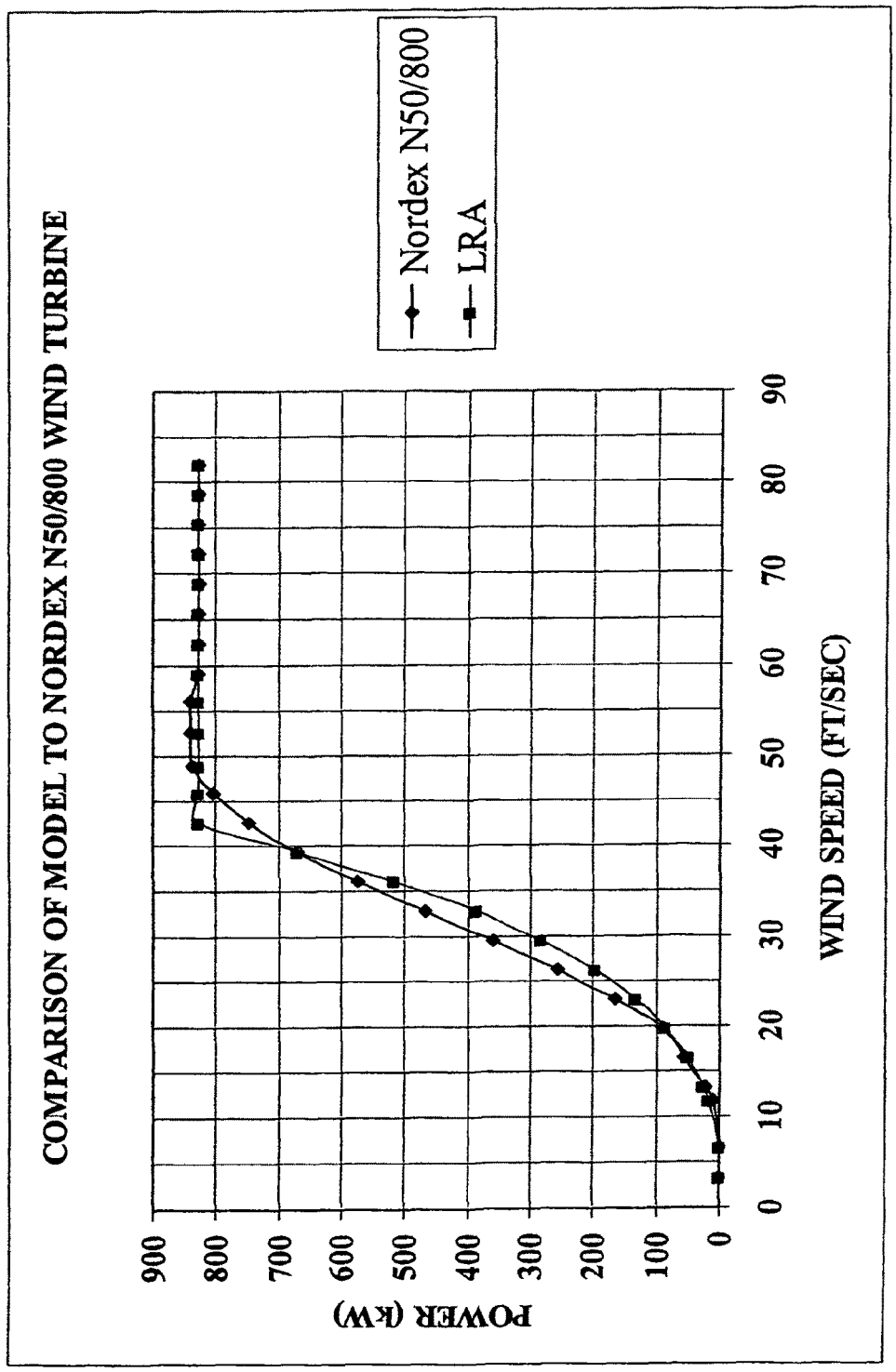
FIG. 5 shows a comparison between the Nordex N50/800 and a computer model.

Before discussing the development of the delivery schedules, it is pertinent to discuss the selection of the wind turbines, which will determine the power output capacity for each windmill station, and therefore, play a role in the design of the daily delivery schedules. In this respect, it is important to note that the overall design of the wind farm, including the total number of windmill stations that are to be installed, can be based on the criteria that have been explained in Applicants' previous application, which has been incorporated herein by reference. In the particular example shown here, Applicant has selected the Nordex N50/800 wind turbine, the performance of which is being compared to a computer model in FIG. 5. This product has been chosen for this example, but any conventional wind turbine could have been used. The selected wind turbine has a 50 meter diameter blade, a 50 meter tower height and a swept area of 1,964 square meters. It turns on at 3 meters per second, and has a design wind speed of 14 meters per second. This size was selected because the power generation capacity is suited for large applications, such as 100 to 1,000 MW wind farms, while at the same time, the product is small enough to be transported by truck and rail.

The example storage facility has also been designed with 62 storage tanks, each being 60 feet long and 10 feet in diameter, with a rating of 600 psig. This allows for the use of standard off-the-shelf components and hardware, which can reduce the overall cost of installation. The design takes into account the worst case scenarios, i.e., days where the most number of tanks are required, to determine the total number of tanks that are needed for the wind farm at the site under consideration. The pipeline system can similarly be designed with the appropriate storage capacity, based on the size of the pipe, and its length.

The methodology applied in formulating a delivery schedule for each upcoming day involves at least the following three design considerations that relate to how much energy is generated by the immediate use stations, and how much is generated by the energy storage stations (including the hybrid stations that have been converted to one or the other):

1. The peak pressure in storage should not exceed 600 psig;
2. At any moment in time, the pressure in storage should never be less than 100 psig; and
3. Pressure in storage at the end of each day should equal or exceed that at the beginning of each day, if possible.

Based on these considerations, an iterative process is preferably used to determine how many of each type of windmill station should be in operation at any moment in time. Using the methodologies discussed in the previous application, and the concepts discussed herein, the design that has been chosen for this example is as follows: 24 immediate use stations, 6 energy storage stations, and 19 hybrid stations. This enables the system to be adjusted within a range of between a maximum of 43 immediate use windmills (24 immediate use stations and 19 hybrid stations converted to immediate use), and a maximum of 25 energy storage windmills (6 energy storage stations and 19 hybrid stations converted to energy storage). In general, more immediate use stations are used when there are fewer variations in wind speed, and more energy storage stations are used when there are more variations in wind speed. The system also has the ability to shut off or otherwise vent power from any of the windmill stations so that the appropriate ratio between immediate use and energy storage can be obtained at all times, if necessary.

Figure 6:
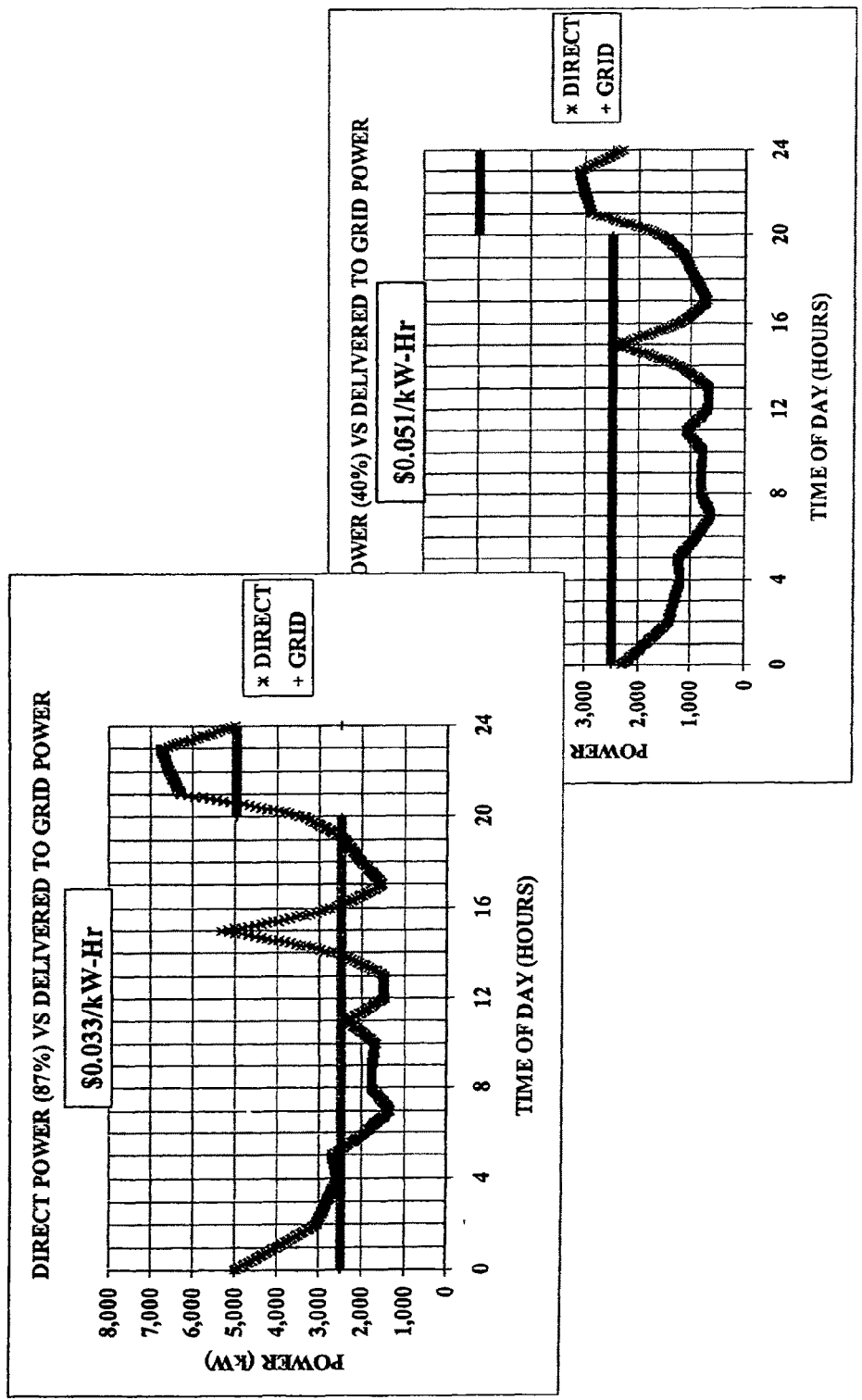
FIG. 6 contains two charts showing two potential delivery schedules for Nov. 1, 1996.

FIG. 6 shows two different delivery schedules that have been developed for a 24-hour period on Nov. 1, 1996. Both charts compare the constant output curve (shown by the two straight lines) with the wind/power availability curve. The difference between the two schedules relates to how many immediate use and energy storage stations have been placed in operation during the day. The first chart represents a system with a setting where 87% of the total wind generated power is delivered to the user or grid directly from the immediate use stations, and 13% of the power is processed through storage. The second chart represents a setting where 40% of the wind generated power is delivered to the user or grid from the immediate use stations, and 60% of the power is processed through storage.

In both examples, each delivery schedule has been developed to provide two substantially constant power output periods, one lasting 20 hours, and the other lasting 4 hours. This was primarily based on the shape of the wind speed curve on that day, which shows that the wind speed fluctuated around 5 meters per second during the first 20 hours, and then jumped to fluctuate around 7 meters per second during the last 4 hours. For this reason, the schedule was designed to provide a substantially constant energy output level of about 2,500 kW during the first 20 hour period, and a substantially constant energy output level of about 5,000 kW during the last 4 hour period.

Setting the delivery schedule to provide relatively few substantially constant power output level periods during each day enables the system to avoid surges and swings that could otherwise adversely affect the system. Had only the immediate use stations been used, like in a conventional windmill system, the amount of energy supplied to the user or grid would have followed the peaks and valleys of the wind speed curve, which had severe fluctuations and oscillations. In such case, a severe peak or spike of energy would have been delivered to the user or grid at about 3 p.m., along with other fluctuations and oscillations, placing additional stress and strain on the power system. By using the present invention, on the other hand, it can be seen that the amount of power delivered to the grid was very predictable and constant over an extended period of time.

It can also be seen from FIG. 6 that the cost of supplying power using the first schedule was $0.033/kW-Hr, while the cost of the power using the second schedule was $0.051/kW-Hr. This is due to the inefficiencies associated with having to obtain a greater percentage of the energy from storage than from the immediate use stations. For this reason, what this shows it that it is usually desirable to use the schedule that relies for a greater percentage of the power on the immediate use stations than on the energy storage stations. In alternate embodiments, such as where the compressed air energy does not have to be converted into electricity, the efficiencies of energy placed in storage will be increased, wherein a proportionally less amount of energy would have to be stored, when compared to energy used immediately, to maintain the appropriate balance between the energy used immediately and the energy stored.

During the time that the system is in operation, in addition to selecting a schedule that relies as much on energy from immediate use than from energy storage, it is also desirable to balance the energy that is in storage, by keeping a balance between the energy that is introduced into storage, with the energy that is being extracted from storage, so that at the end of each day, the amount of energy in storage is no less than it was at the end of the previous day. Moreover, as discussed above, another consideration is to always maintain at least 100 psig of pressure in storage, so that in case the wind conditions do not actually occur as predicted in the forecasts, there will be sufficient energy left over that could be relied upon at a later time if needed. At the same time, it is also desirable not to have more than a predetermined amount of pressure in storage, in which case pressure may have to be vented and wasted.

The energy processed through storage involves the following three scenarios, which must be accounted for in the development of the delivery schedule:

First, the system must be designed to account for periods when the input level into storage is equal to the output. That is, if the constant delivery power output level matches the rate at which power is being supplied from a combination of the immediate use and energy storage stations, then theoretically, the amount of energy in storage will remain substantially constant during these periods. Of course, this does not take into account certain inefficiencies, as well as waste heat from the compressor, and any of the heating devices discussed above. Nevertheless, it is clear that there will be times when the amount in storage will remain substantially constant. This can occur, for example, when no energy from storage is used, and all of the energy is obtained from the immediate use stations, to maintain the constant power output level.

Second, the system must be designed to account for periods when the input level into storage is less than the output. During these periods, it can be seen that a greater percentage of energy will be extracted from storage, than will be provided into storage, to maintain a constant power output level, in which case the amount of energy in storage can be reduced over time. While this can go on temporarily for a short period of time, eventually, the delivery schedule would have to be adjusted so that the energy in storage will be re-stored, to maintain the level of energy in storage in substantial equilibrium. In other words, the delivery schedule must be adapted to factor in the potential for more energy being introduced back into storage later that day, in order for the amount of energy in storage at the end of each day to equal or exceed the amount in storage at the beginning of each day.

Third, the system must be designed to account for periods when the input level into storage is more than the output. In this case, energy will be introduced into storage at a rate that is greater than that at which it is extracted. As discussed, this is important because of the second scenario, where the energy in storage can otherwise become reduced. In this case, the delivery schedule must be adapted to account for the possibility that during some periods a greater percentage of energy will be introduced into storage than would be extracted from storage, such that the amount of energy in storage can be increased over time. At the point that the pressure becomes too high, however, the pressure will have to be vented, and/or the compressors will have to be turned off.

Figure 7A:
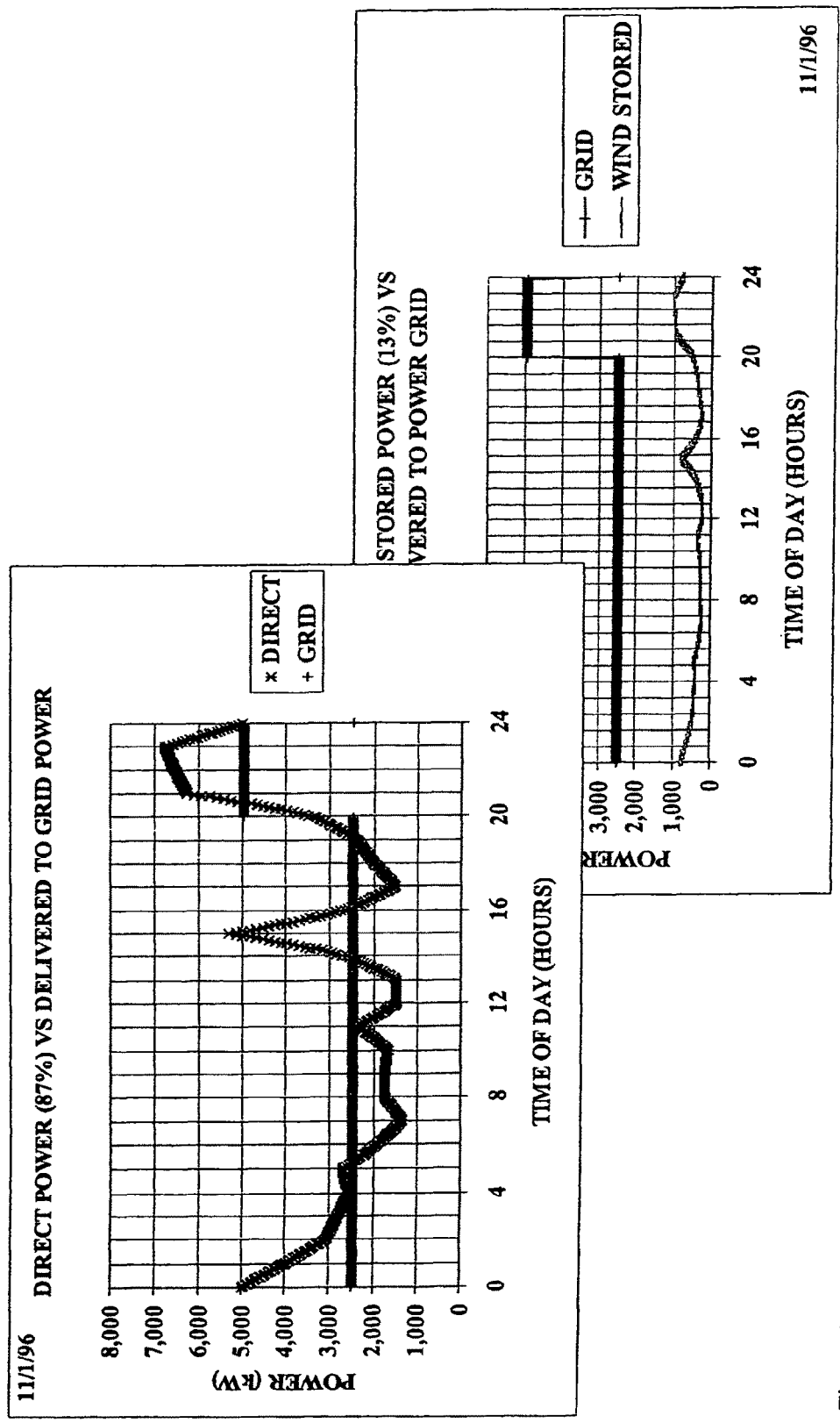
FIG. 7a contains two charts showing an 87/13 ratio between immediate use and energy storage, the top chart comparing the constant output periods with the wind/power availability curve, and the bottom chart comparing the constant output periods with the amount of power supplied into storage, both for the same Nov. 1, 1996 day.

The first chart in FIG. 7a shows the two constant power output periods (one lasting 20 hours and the other lasting 4 hours) being compared to the amount of energy that is being supplied into storage, which is shown by the up and down curve. It can be seen that there are severe differences between these curves, which represent the second and third scenarios discussed above, i.e., periods where input exceeds output, or output exceeds input. As shown in the second chart of FIG. 7a, there are changes in the "wind stored" curve, which occur by virtue of the energy level in storage being increased at times, and reduced at times, depending on which of the above scenarios apply at any moment in time. This chart shows that less than 1,000 kW of net power was supplied into storage at any given time based on 87% of the power being supplied directly to the grid, and 13% of the power being processed through storage. The curvature of the "wind stored" line also shows that the amount of energy being supplied into storage can fluctuate over time.

Figure 7B:
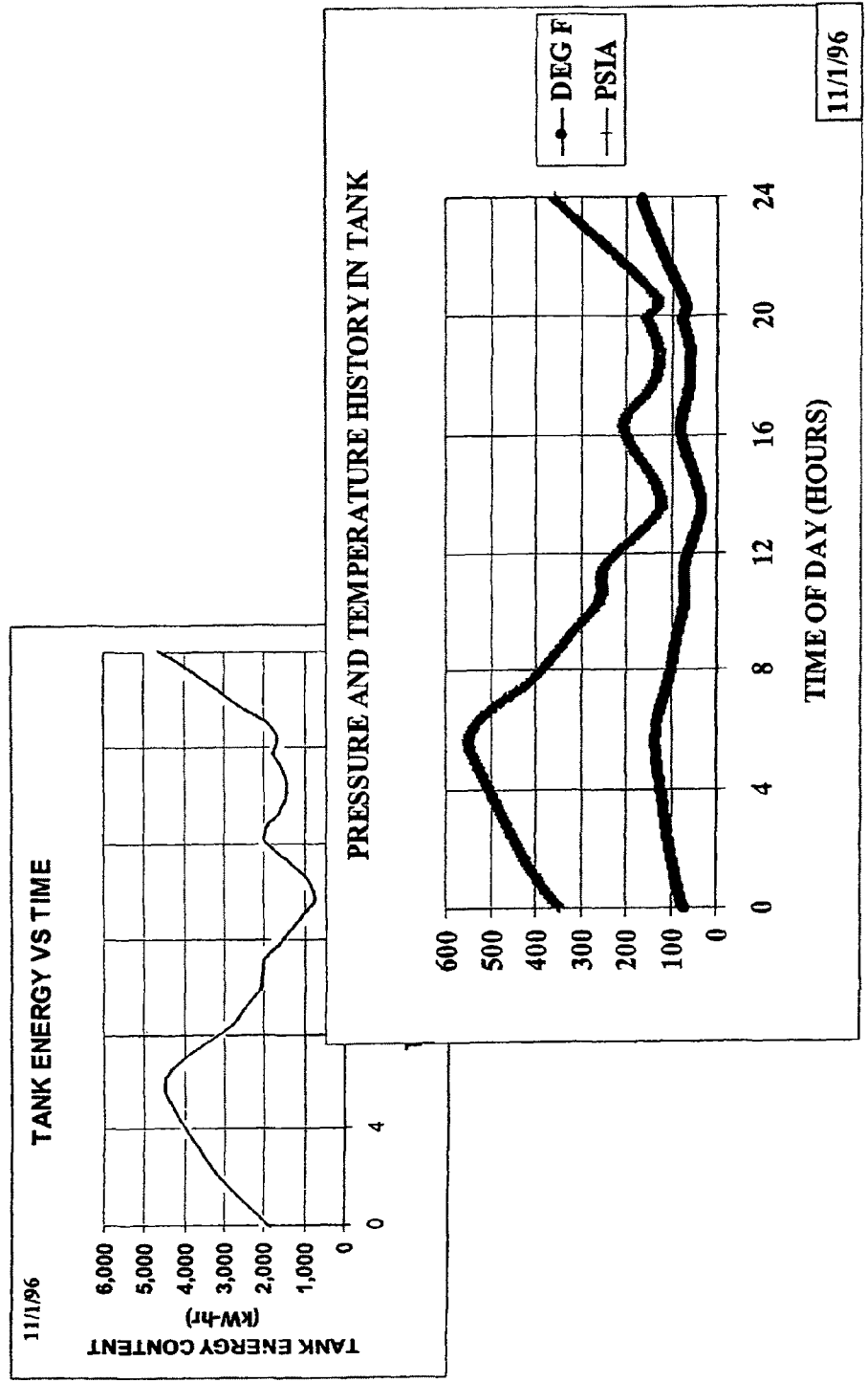
FIG. 7b contains two charts, the top chart showing the amount of energy in storage over time, and the bottom chart showing the pressure and temperature curves in storage, both for the same Nov. 1, 1996 day.

FIG. 7b shows the net energy accumulated into storage during the day, again, based on the occurrence of the three scenarios discussed above. It can be seen from the top chart in FIG. 7b that the accumulated energy in storage fluctuates over the course of the day, which is necessary for the power output levels to remain constant. It can also be seen in the bottom chart that the pressure level (shown by the top curve) in storage drops to almost 100 psig at about 1:00 p.m. and then again between 6:00 and 8:00 p.m., which is a result of a combination of the three scenarios discussed above, where net energy being extracted may exceed the net energy being supplied. It can also be seen that the delivery schedules have been plotted successfully to ensure that the pressure never goes below 100 psig, and that an equal amount or more energy is in storage at the end of the day than at the beginning of the day. The pressure also never exceeds 600 psig.

In actual practice, since these delivery schedules will be based on projected wind speed forecasts, the actual planning of the schedules will have to reflect a fairly conservative approach, to account for the possibility that the actual wind conditions may not be as anticipated. If the schedules are not conservative, it may be possible that the pressures could fall below 100 psig or run out altogether, in which case there will not be enough pressure in storage to supply power to the user or grid. If energy in storage does run out, the system will fail to be able to provide a constant power output level during those times, i.e., wind speed fluctuations will continue to cause fluctuations in the delivery of power output, since there will be no energy in storage to offset and smooth the wind speed and power generation fluctuations from the immediate use stations. In such case, the delivery schedule will have to be adjusted to make up for the loss of power in storage during the previous periods, which the present invention contemplates may be necessary at times. On the other hand, if the schedules are too conservative, pressure in storage may have to be vented, in which case energy may be wasted.

FIGS. 8a and 8b, and 9a and 9b, show similar charts for the 24 hour periods on Nov. 5 and 6, 1996, respectively.

Figure 8A:
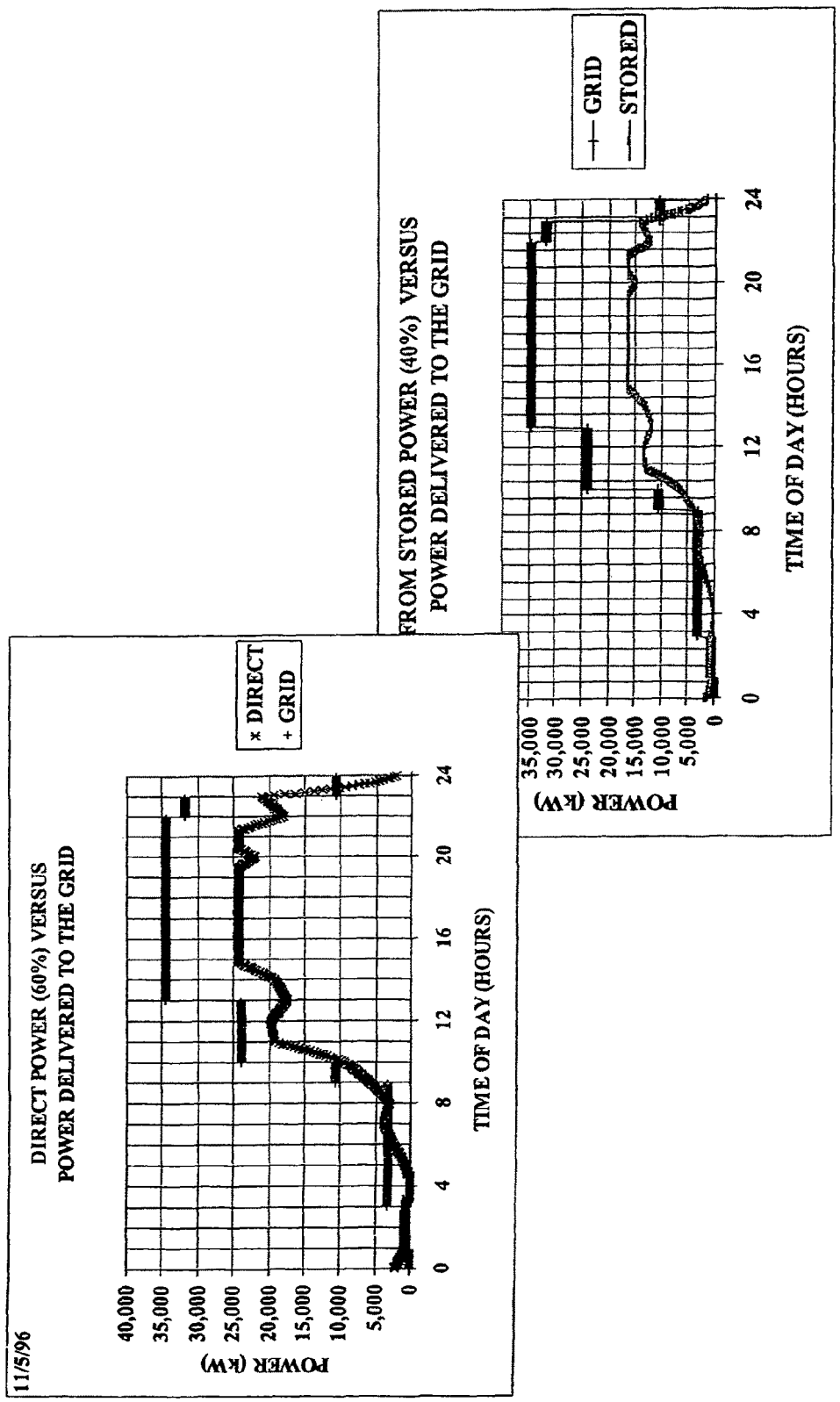
FIG. 8a contains two charts for Nov. 5, 1996 at the same site showing a 60/40 ratio between immediate use and energy storage, the top chart comparing the constant output periods with the wind/power availability curve, and the bottom chart comparing the constant output periods with the amount of power supplied into storage.

FIG. 8a shows a delivery schedule that has been developed for the 24-hour period on Nov. 5, 1996, based on the wind history that occurred on that day. This chart represents a delivery schedule where 60% of the total wind generated power is delivered to the grid directly from the immediate use stations, and 40% of the power is processed through storage. Because the wind speed curve on this day varied significantly, this delivery schedule was developed to provide seven different constant power output periods, not two or three.

The first constant level period (from midnight to 3:00 a.m.) provides very little if any power to the grid. This is mainly due to the fact that there was little or no wind during that time.

The second constant level period from 3:00 a.m. to 9:00 a.m. provides about 4,000 kW, which is due to a slight increase in wind speed beginning at about 4:00 a.m. The third constant level period extends only from 9:00 a.m. to 10:00 a.m. due to the sharp increase in wind speed that begins at about 8:00 a.m. This period is short because the increase in wind speed is so dramatic that the output had to be increased to 10,000 kW to efficiently use the energy being supplied and generated.

The fourth constant level period extends from 10:00 a.m. to 1:00 p.m., at a level of about 24,000 kW, which reflects the increasing wind speeds during that time. Because the wind speed continues to increase after 1:00 p.m., and continues to blow at very high levels, the fifth constant level period is set at 35,000 kW and extends for nine hours from 1:00 p.m. to 10:00 p.m. This is the period during which the power levels are constant for the longest period during the day, wherein the output levels and therefore delivery of power to the grid are predictable and stable.

What happens at the end of the day, towards midnight, however, is that the wind speeds begin to drop off dramatically. Accordingly, the final two hours of the day are broken up into two more constant power level periods, beginning with a level of about 32,000 kW from 10:00 p.m. to 11:00 p.m., and then dropping significantly to about 10,000 kW from 11:00 p.m. to midnight. While it is certainly more advantageous to create fewer constant level periods during each day, when considering the severe fluctuations and oscillations that have occurred during the day, it can be seen that the system was required to be adjusted more frequently to provide the degree of predictability and stability that would be needed to provide the advantages discussed above. By using the present invention, the amount of power delivered to the grid was made more predictable and constant for fixed periods during the day, even though there were more of those periods on this day than on November 1.

The second chart in FIG. 8a shows the net energy being supplied into storage during the day (shown by the grey line). This is based on having 40% of the power from the windmill stations being introduced into storage, while at the same time, a certain amount of energy being extracted from storage at a rate necessary to maintain the overall power output levels relatively constant. Again, the amount stored is based on the accumulation of various conditions existing throughout the day, including the occurrence of the three scenarios discussed above.

It can be seen from the second chart in FIG. 8a that the supply of energy into storage fluctuates over the course of the day, from a relatively small amount in the morning, to a relatively large amount in the afternoon. Although a greater amount of power is delivered to the user or grid during the afternoon hours, the immediate use stations generate the bulk of that power. Accordingly, it can be seen that a significant amount of energy is being supplied into storage during the afternoon hours, even though a significant amount of power, i.e., 35,000 kW, is delivered to the grid at the same time.

Figure 8B:
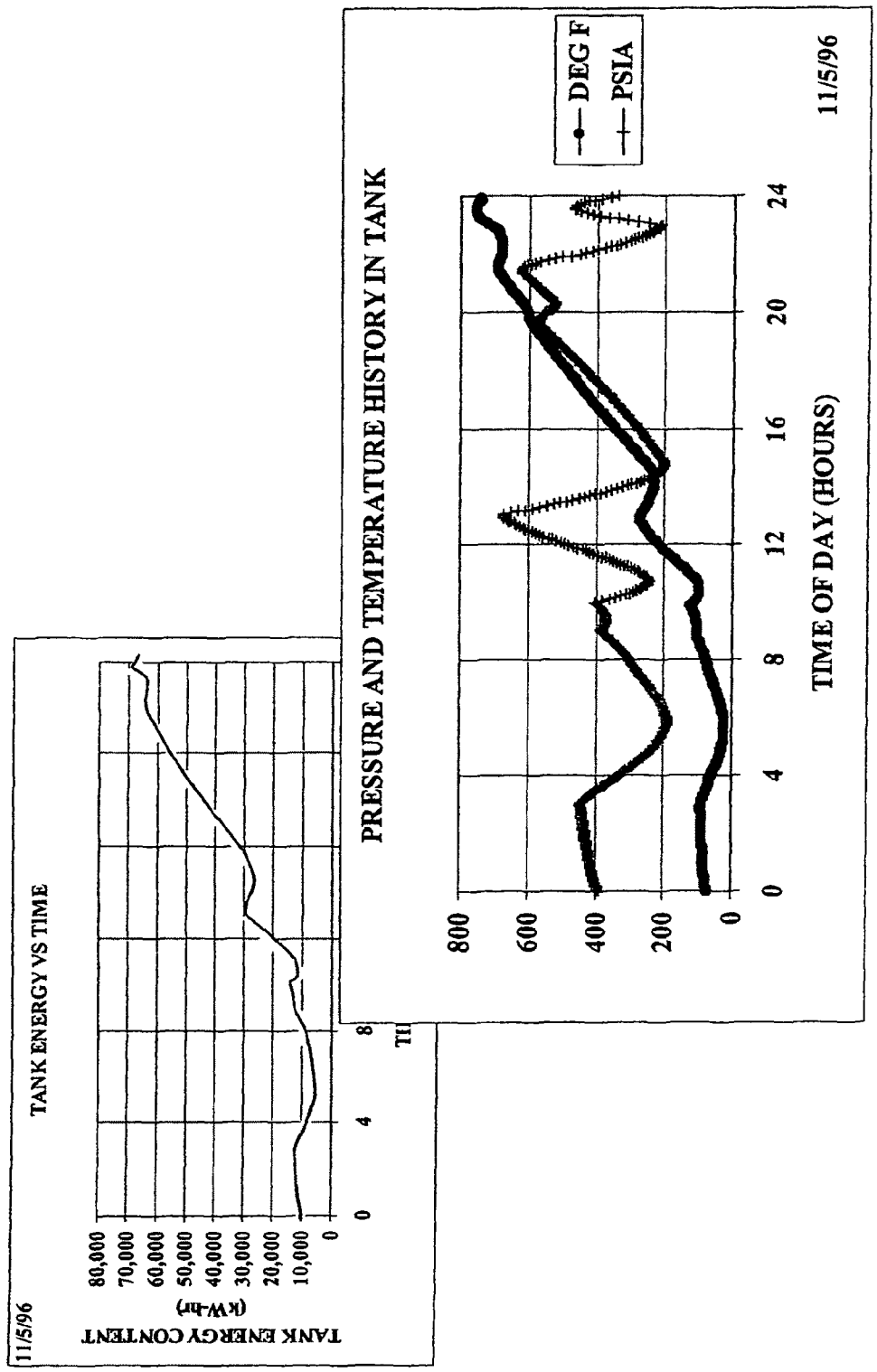
FIG. 8b contains two charts for Nov. 5, 1996, the top chart showing the amount of energy in storage over time, and the bottom chart showing the pressure and temperature curves in storage.

The top chart in FIG. 8b shows the accumulation of energy in storage during that day, which increases substantially over time. This is due to the significant amount of energy that is being introduced into storage, as shown in the bottom chart of FIG. 8a. The top chart of FIG. 8b shows the curve going from about 10,000 kW-hr to about 70,000 kW-hr over the course of the 24 hour period.

The bottom chart shows that there are contributions being made to the total energy by virtue of the temperature and pressure levels increasing in storage as well. It also shows severe fluctuations in the amount of pressure in storage, which is one of the reasons that seven different constant output level periods had to be scheduled on that day, to ensure that the pressure never exceeded 600 psig, and never went below 100 psig, although it can be seen that an excessive buildup of pressure in storage that exceeded 600 psig nevertheless occurred at about 1:00 p.m.

Figure 9A:
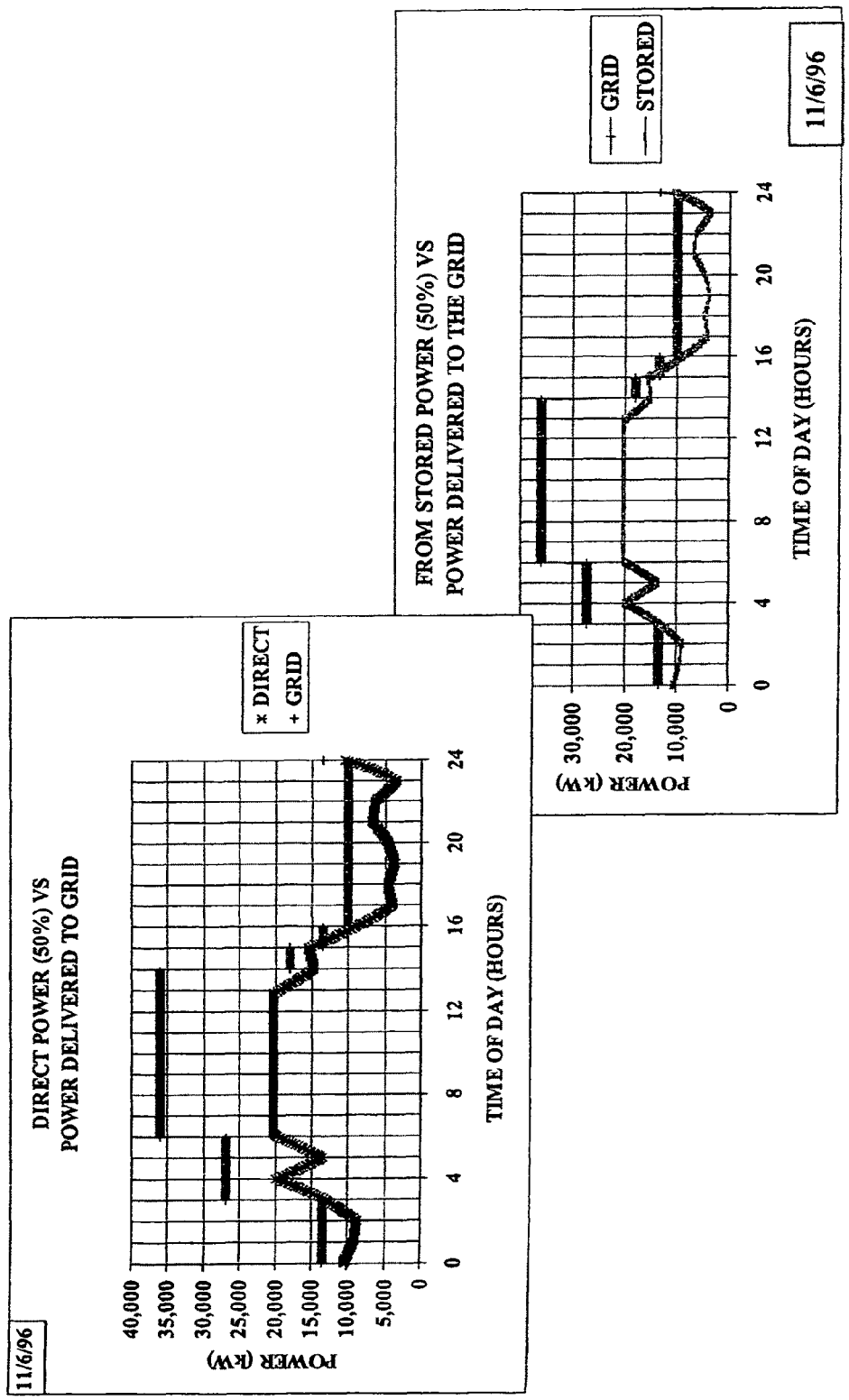
FIG. 9a contains two charts for Nov. 6, 1996 at the same site showing a 50/50 ratio between immediate use and energy storage, the top chart comparing the constant output periods with the wind/power availability curve, and the bottom chart comparing the constant output periods with the amount of power supplied into storage.

FIG. 9a shows a delivery schedule that has been developed for the 24-hour period on Nov. 6, 1996, based on the wind history that occurred on that day. This chart represents a delivery schedule where 50% of the total wind generated power is delivered to the user or grid directly from the immediate use stations and 50% of the power is processed through storage. Because the wind speed curve on this day varied significantly, this delivery schedule was developed to provide six different constant power output periods, which, as discussed below, was necessary to maintain the pressure in storage between 100 psig and 600 psig.

On this day, the amount of power remaining in storage from the previous day was relatively high, as discussed above, and the wind speeds were relatively high during the early morning hours, and continued to be high throughout the morning and into early afternoon, when it began to drop off slightly. Accordingly, the delivery schedule shows a significant amount of power being delivered to the grid during the late morning and early afternoon hours, with several incrementally increasing constant power output periods extending from midnight the night before until about 2:00 p.m. For example, three constant level periods were implemented, including one from midnight until 3:00 a.m., wherein the energy delivered was about 14,000 kW. In the other two periods, one extended from 3:00 a.m. to 6:00 a.m., with about 27,000 kW of energy being delivered, and another extended from 6:00 a.m. to 2:00 a.m., with about 36,000 kW of energy being delivered during that period.

When the wind speeds began to drop off, however, the amount of power scheduled to be delivered also dropped off. Three additional constant level periods were experienced, including one from 2:00 p.m. until 3:00 p.m., where the energy delivered was about 18,000 kW, one from 3:00 p.m. to 4:00 p.m., with about 13,000 kW of energy being delivered, and the last from 4:00 p.m. to midnight, with about 10,000 kW of energy being delivered. During this day, while the schedule called for six constant output level periods, two of the periods lasted for 8 hours each, which provided an extended period of 16 hours during which output levels were constant for an extended period of time.

The second chart in FIG. 9a shows the net energy being supplied into storage during the day (shown by the grey line), which is based on having 50% of the power from the windmill stations introduced into storage. It can be seen that the supply of energy into storage fluctuates over the course of the day, starting with a relatively high level of energy being supplied during the morning hours when the wind speeds were high, to a relatively low level of energy being supplied into storage during the afternoon and evening hours when the wind speeds began to dissipate. In this case, the bulk of the power delivered to the grid during the morning hours was generated by the immediate use stations, but a substantial amount of power was also being delivered through storage, as the difference between the two curves show in the top chart in FIG. 9a.

Figure 9B:
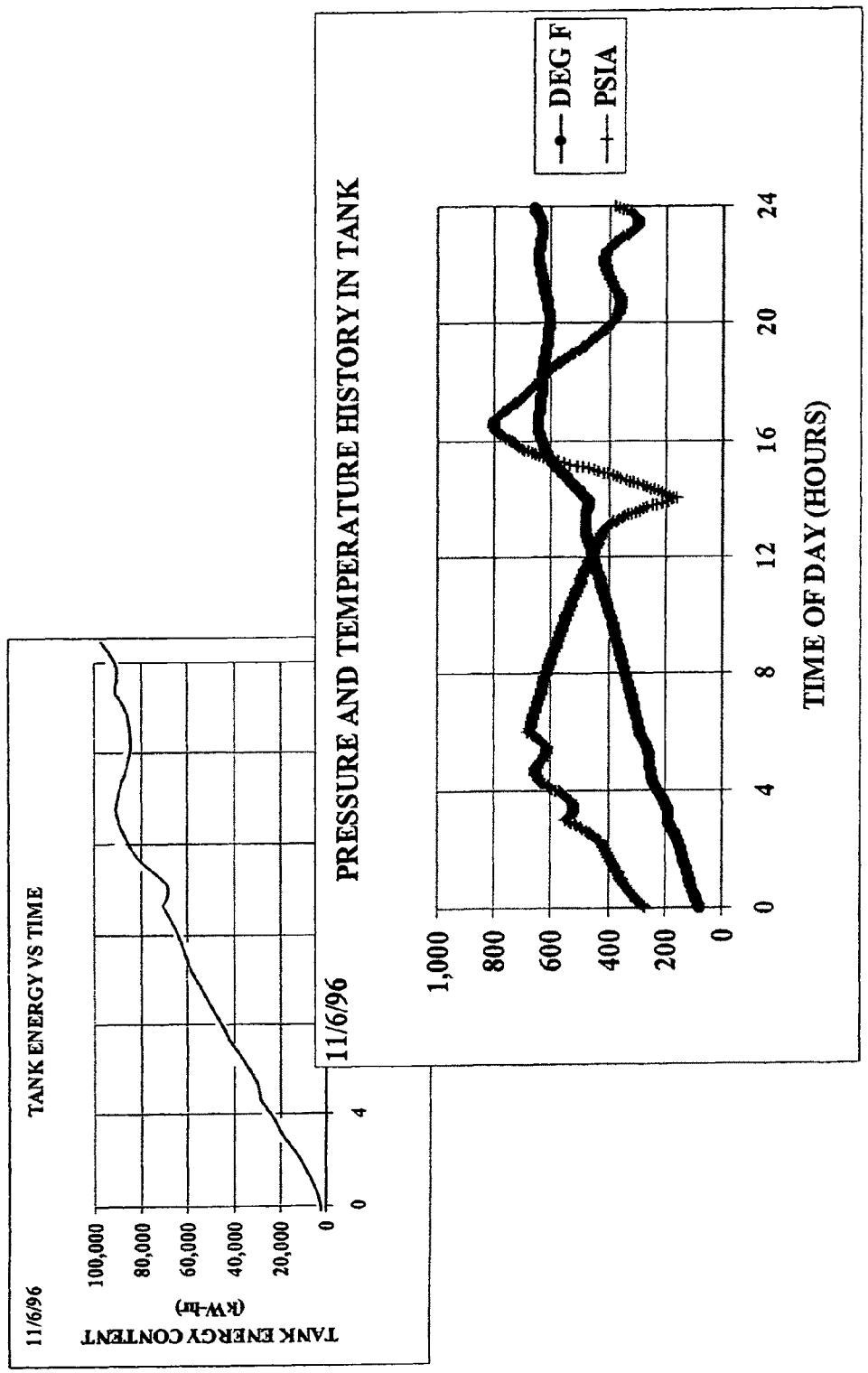
FIG. 9b contains two charts for Nov. 6, 1996, the top chart showing the amount of energy in storage over time, and the bottom chart showing the pressure and temperature curves in storage.
Figure 11:
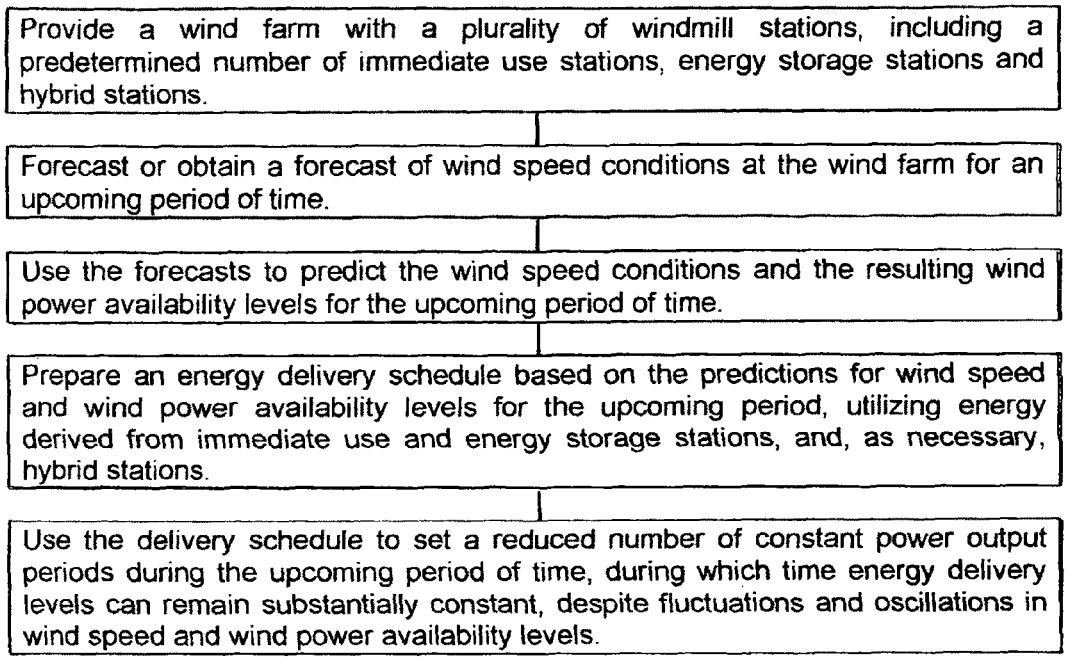
FIG. 11 represents a first method of the present invention wherein a limited number of substantially constant power output periods are scheduled each day.
Figure 12:
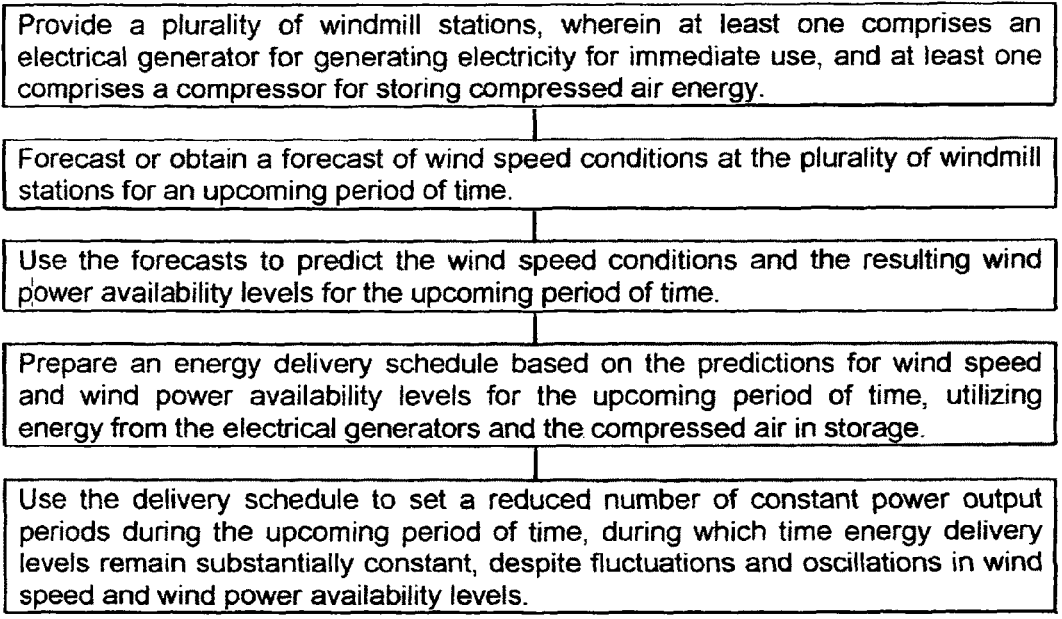
FIG. 12 represents a second method of the present invention wherein a limited number of substantially constant power output periods are scheduled each day.

The top chart in FIG. 9b shows the accumulation of energy in storage during the day, wherein the amount increases steadily over time. This is due to the significant amount of energy being introduced into storage, as shown in the bottom chart of FIG. 9a, particularly during the morning hours. The top chart of FIG. 9b shows the curve going from about 0 kW-hr to about 90,000 kW-hr over the course of the 24 hour period. The bottom chart shows that there are contributions being made to the total energy from the temperature and pressure increases, which fluctuated substantially, in storage as well.

As can be seen in the bottom charts on FIGS. 8a and 9a, the pressure curve fluctuated considerably during the two day period between Nov. 5 and 6, 1996. These pressure curves are significant because they show how important it is to change the level of the constant level output periods occasionally to ensure that the pressures do not go below 100 psig, nor above 600 psig. As can be seen, the curve on several occasions, on November 6, went above the 600 psig level. In some circumstances, such as when temperature levels are above 70 degrees F., it may be permissible to increase the pressure to 800 psig, although the system would have to be designed with the appropriate storage facilities to ensure that higher pressures can be handled by the system.

FIG. 10 shows how the delivery schedule was carried out using a predetermined number of immediate use, energy storage and hybrid stations on any given day during the period. On each day, all of the windmill stations were operational, but the ratio between the types of stations that were used at any given moment was adjusted based on how many hybrid stations were set to immediate use and energy storage. For example, on November 1, the total ratio used included 43 immediate use windmills (including 24 immediate use stations and 19 hybrid stations converted to immediate use) and 6 energy storage stations. This accounted for the 87% to 13% ratio discussed above.

On November 5, the ratio included 30 immediate use windmills (including 24 immediate use stations and 6 hybrid stations converted to immediate use) and 19 energy storage windmills (including 6 energy storage stations and 13 hybrid stations converted to energy storage). This accounted for the 60% to 40% ratio discussed above.

On November 6, the ratio included 25 immediate use windmills (including 24 immediate use stations and 1 hybrid station converted to immediate use) and 24 energy storage windmills (including 6 energy storage stations and 18 hybrid stations converted to energy storage). This accounted for the 50% to 50% ratio discussed above.

The chart also shows that the number of storage tanks required at any given moment will depend on the number of energy storage stations that are operational. Also, the chart shows that over the course of a 20 year period, the cost of the energy generated by these three different delivery schedules remains relatively constant, i.e., about $0.033 kW-hr.

What is claimed is:
1. A method of coordinating and stabilizing the delivery of wind generated power, comprising:
   producing compressed air energy using at least one windmill station with a compressor capable of generating compressed air energy;
   storing said compressed air energy in a pipeline capable of distributing said compressed air energy to a remote location;
   forecasting or obtaining a forecast of wind speed conditions at said windmill station and predicting the wind speed conditions and the resulting wind power availability levels for the upcoming period of time based on the forecast;

preparing an energy delivery schedule to the remote location based on the predictions for wind speed and wind power availability levels for the upcoming period of time, taking into account the amount of energy that can be stored and used at a later time; and setting a reduced number of constant power output periods based on the delivery schedule during the upcoming period of time, during which time energy delivery levels are substantially constant, despite fluctuations and oscillations in wind speed and wind power availability levels.

2. The method of claim 1, wherein the upcoming period of time is the next 24 hour period and the method comprises setting no more than seven constant power output periods during any given 24 hour period.

3. The method of claim 1, wherein the method comprises providing a predetermined number of immediate use stations dedicated to providing energy for immediate use, and a predetermined number of energy storage stations dedicated to storing energy for later use, and determining the ratio between the number of immediate use and energy storage stations that are to be in operation during the upcoming period of time.

4. The method of claim 3, wherein the delivery schedule determines the amount of energy that can be supplied directly from the immediate use stations, and the amount of energy that can be provided from storage from the energy storage stations, and the amount of energy expected to be used and withdrawn so as to maintain a predetermined amount of energy in storage.

5. The method of claim 1, wherein the delivery schedule is set so that the amount of energy in storage from the energy storage stations at the end of the upcoming period of time is equal to or greater than the amount of energy in storage at the beginning of the upcoming period of time.

6. The method of claim 1, wherein the delivery schedule is set so that the amount of pressure in storage at any given time will not exceed 600 psig or go below 100 psig.

7. The method of claim 3, wherein the method comprises providing a predetermined number of hybrid windmill stations dedicated to providing energy for immediate use and/or storage, and using the hybrid stations to supplement the number of stations that are in operation.

8. The method of claim 7, wherein the immediate use stations are adapted to supply electrical energy directly to the remote location, and the energy storage stations are adapted to provide energy into storage, and the hybrid stations are adapted to switch between being an immediate use station to supply electrical energy directly, and an energy storage station to provide compressed air energy into storage.

9. The method of claim 1, wherein said remote location is provided with pneumatically driven equipment, and the compressed air energy in said pipeline is released at said remote location to drive said pneumatically driven equipment without having to convert the compressed air energy into electricity first.

* * * * *

UNITED STATES PATENT AND TRADEMARK OFFICE
CERTIFICATE OF CORRECTION

PATENT NO. : 7,974,742 B2  Page 1 of 1
APPLICATION NO. : 12/001092
DATED : July 5, 2011
INVENTOR(S) : Ben M. Enis and Paul Lieberman It is certified that error appears in the above-identified patent and that said Letters Patent is hereby corrected as shown below:

In Column 1, line 6, the first sentence of the specification beneath the title should read:

"This application is a continuation in part of U.S. Application Serial No. 11/242,378, filed Oct. 3, 2005, which is a continuation in part of U.S. Application Serial No. 10/865,865, filed June 14, 2004, which claims priority from U.S. Provisional Application No. 60/478,220, filed on June 13, 2003."

Signed and Sealed this
Fourth Day of October, 2011

David J. Kappos
*Director of the United States Patent and Trademark Office*